(12) United States Patent
Schär

(10) Patent No.: US 10,656,259 B2
(45) Date of Patent: May 19, 2020

(54) METHOD FOR DETERMINING TRAJECTORIES OF MOVING PHYSICAL OBJECTS IN A SPACE ON THE BASIS OF SENSOR DATA OF A PLURALITY OF SENSORS

(71) Applicant: SCHWEIZERISCHE EIDGENOSSENSCHAFT EIDGENÖSSISCHES DEPARTEMENT FÜR VERTEIDIGUNG, BEVÖLKERUNGSSCHUTZ UND SPORT ARMASUISSE WISSENSCHAFT UND TECHNOLOGIE, Thun (CH)

(72) Inventor: Sacha Schär, Zollikofen (CH)

(73) Assignee: SCHWEIZERISCHE EIDGENOSSENSCHAFT EIDGENÖSSISCHES DEPARTEMENT FÜR VERTEIDIGUNG, BEVÖLKERUNGSSCHUTZ UND SPORT ARMASUISSE WISSENSCHAFT UND TECHNOLOGIE, Thun (CH)

( * ) Notice: Subject to any disclaimer, the term of this patent is extended or adjusted under 35 U.S.C. 154(b) by 556 days.

(21) Appl. No.: 14/902,152

(22) PCT Filed: Jul. 1, 2014

(86) PCT No.: PCT/CH2014/000091
§ 371 (c)(1),
(2) Date: Feb. 26, 2016

(87) PCT Pub. No.: WO2015/000089
PCT Pub. Date: Jan. 8, 2015

(65) Prior Publication Data
US 2016/0259043 A1    Sep. 8, 2016

(30) Foreign Application Priority Data

Jul. 4, 2013   (CH) ...................................... 1202/13

(51) Int. Cl.
*G01S 13/58*     (2006.01)
*G01S 13/72*     (2006.01)
(Continued)

(52) U.S. Cl.
CPC ............ *G01S 13/58* (2013.01); *G01S 13/723* (2013.01); *G01S 13/87* (2013.01); *G01S 13/89* (2013.01); *G01S 7/40* (2013.01); *G01S 7/41* (2013.01)

(58) Field of Classification Search
None
See application file for complete search history.

(56) References Cited

U.S. PATENT DOCUMENTS 5,793,931 A    8/1998   Hillis
7,692,573 B1   4/2010   Funk
(Continued)

FOREIGN PATENT DOCUMENTS

DE            101 33 945 A1    2/2003
DE    10 2005 041 705 A1    3/2007
(Continued)

OTHER PUBLICATIONS

Blackman et al. "Multiple SEnseor Tracking: Issues and Methods", Designa nd Analysis of Modern Tracking Systems, Jan. 1999, pp. 595-659.*
(Continued)

*Primary Examiner* — Suzanne Lo
(74) *Attorney, Agent, or Firm* — Birch, Stewart, Kolasch & Birch, LLP

(57) ABSTRACT

In a method for determining trajectories of movable physical objects in a space on the basis of sensor data from a plurality
(Continued)

of sensors, first data objects are generated based on the sensor data, wherein each first data object comprises at least one timestamp and one location specification of an object detected by at least one of the sensors, and a validation function. At least one model object, which represents a parameterization of a trajectory of one of the movable objects with at least one variable parameter, is provided. Then, a correspondence value is calculated for the first data objects, for an assignment of the respective data object to at least one of the model objects provided by way of evaluating the validation function of the data object for the model objects. An additional model object is provided and the data object is assigned to the additional model object if none of the correspondence values lie in a predetermined range. The data object is assigned to the model object provided that corresponds to the best correspondence value if at least one of the correspondence values lies in the predetermined range. A numerical optimization of a target function for the model object to which the data object was assigned is performed by varying the at least one variable parameter of the model object, wherein the target function is a function of parameter adaptation functions of at least some of the data objects assigned to the model object. Finally, the at least one variable parameter of this model object is updated.

25 Claims, 7 Drawing Sheets

(51) Int. Cl.
  *G01S 13/87* (2006.01)
  *G01S 13/89* (2006.01)
  *G01S 7/40* (2006.01)
  *G01S 7/41* (2006.01)

(56) References Cited

U.S. PATENT DOCUMENTS

2005/0021201 A1 1/2005 Klotz et al.
2010/0007544 A1 1/2010 Honikel et al.
2011/0270592 A1 11/2011 Kalender et al.

FOREIGN PATENT DOCUMENTS

DE   10 2010 019 147 A1   11/2011
WO   WO-2007/144570 A1   12/2007

OTHER PUBLICATIONS

Asseo, Sabi J. "Integration of active and passive track files from internetted aircraft for enhanced situation awareness" May 23, 1988, pp. 242-250.*
Garg et al. "C&R Tree based Air Target Classification Using Kinematics" 2012, IJCCT vol. 3, Issue 1, pp. 15-21.*
Jacobs et al. "Automatic Target Recognition Using Sequences of High Resolution Radar Range-Profiles" Apr. 2000, IEEE TRansactions on Aerospace and Electronic Systems, vol. 36, No. 2, pp. 364-382.*
Asseo, Sabi J. "Integration of Active and Passive Track Files From Internetted Aircraft for Enhanced Situation Awareness", May 23, 1988, XP-010076898, pp. 242-250
Blackman et al. "Multiple Sensor Tracking: Issues and Methods", Design and Analysis of Modern Tracking Systems, Jan. 1999, XP-002277517, pp. 595-659.
Farina et al., "Constrained tracking filters for A-SMGCS", Information Fusion, 2003, IEEE, Proceedings of the Sixth International Conference of Jul. 8-11, 2003, vol. 1, XP-010676518, pp. 414-421.

* cited by examiner

METHOD FOR DETERMINING TRAJECTORIES OF MOVING PHYSICAL OBJECTS IN A SPACE ON THE BASIS OF SENSOR DATA OF A PLURALITY OF SENSORS

TECHNICAL FIELD

The invention relates to a method for determining trajectories of movable physical objects in a space on the basis of sensor data from a plurality of sensors. The invention furthermore relates to an arrangement for determining trajectories of movable physical objects in a space.

PRIOR ART

There are numerous applications for determining trajectories of movable physical objects, e.g. flight paths of flying objects. By way of example, a plurality of high-resolution cameras are used in tennis to calculate the trajectory of a tennis ball in order to determine by computation as to whether it contacts the ground within or outside of an admissible region.

By way of example, other applications relate to the monitoring of the airspace over a regional territory for air traffic control or defense purposes. What is determined in the process is where flying objects are, where they are flying to and, if possible, what type of flying objects they are.

Depending on the size and the topography of the monitored space, a single sensor does not suffice for comprehensive coverage, particularly if there is shadowing of the radar signals by mountains and/or if the restriction of the coverage by the range of an individual sensor is undesired. Furthermore, for example, conventional search radar stations supply no information, or only inaccurate information, in respect of the elevation, which does not suffice for the assignment of an ideally punctiform whereabouts. Accordingly, it is advantageous to use a multiplicity of differently placed sensors in airspace monitoring.

However, without special precautions, the use of a multiplicity of sensors for a comprehensive and complete coverage also requires a corresponding multiplicity of operative users, as each sensor produces its own air situation picture. The integration of a plurality of air situation pictures into an overall image is complicated; often it is not even possible to evaluate all of the information detected by the sensor stations for systemic and capacity reasons.

In order to reduce the complexity, for example to allow a single operative user to obtain a consolidated air situation picture on the basis of the multiplicity of sensors, it is possible to carry out so-called sensor data fusion, i.e. the measurement data from the individual sensors are unified and only the result of this unification is displayed or processed further by other means. As a result, the whole space covered by the sensors can be monitored by a single operative user or the airspace monitoring can be divided as desired amongst a number of users.

The basis for the sensor data fusion is continuously incoming data records from various sensors. The data records are evaluated and combined. Since, as mentioned above, the sensors are generally spaced apart from one another and they supply location specifications relative to the respective sensor sites, the data records are generally detected in various coordinate systems, which needs to be taken into account within the scope of the fusion.

The sensor data fusion can offer further advantages in addition to the preparation of a comprehensive and consolidated view of a situation detected by a plurality of sensors. By way of example, within the scope thereof, there is a type of averaging of the location information generated by the sensor data, as a result of which the statistical error is reduced. Accordingly, the data resulting from the sensor data fusion enable a higher precision and/or an improved resolution capability in relation to sensor data underlying the fusion. Furthermore, the fused data can have a higher dimension than the sensor data; by way of example, a 3D air situation picture is generated from 2D sensor data of the individual sensors (1 angle, 1 distance).

The prior art has disclosed methods for sensor data fusion. These usually provide for the density functions represented by the sensor data to be directly correlated to one another, wherein a high correlation serves as a basis for a mutual assignment of the sensor data. This correlation is typically accompanied by a transformation of the sensor data into a reference coordinate system and it is generally only approximately calculable due to the geometric complexity of the density functions. A continuous approximation, for example by way of an iterative method, is only possible to a restricted extent due to the computational capacity being limited both in time and in nature.

The aforementioned approximation leads to an inaccuracy in the fused sensor data and can lead to errors when assigning the sensor data to objects. The precision of the established whereabouts suffers thereunder.

In order to obtain an efficient and effective approximation, it is necessary for the sensor data fusion to take into account the sensor-specific nature of the sensor data. This means that the approximated correlation overall cannot be undertaken according to a general principle, but it needs to be undertaken at least in part with sensor-specific method steps. The method specifically used in a system should therefore be adapted to the currently used sensors, which strongly reduces the flexibility because it is also necessary to adapt the evaluation method if the system configuration is changed.

One strategy in the implementation of an approximated correlation of different types of sensor data contains the approximation of the density functions to an appropriately parameterized universal density function such that at least the actual correlation can be carried out according to a general principle. Depending on the sensor type, a more or less complex universal density function is required for a good approximation of the sensor data. However, the complexity of the universal density function is once again restricted by the computational capacity, and so inaccuracies also need to be accepted here.

Another strategy in the implementation of an approximated correlation of different types of sensor data consists of developing a partial method for correlating the density functions for each combination of sensor types, which partial method is optimized to this combination. However, this is only manageable if the sensor data fusion comprises a comparatively small number of different sensors.

The sensors which detect the data, e.g. radar stations, are often subject to large inaccuracies. Moreover, systematic errors in the data arriving at an evaluation unit must also always be expected. Therefore, the specifications about flying object distance and azimuth are also subject to accuracy variations and/or systematic errors. Moreover, each sensor is restricted to a specific detection angle and detection region and, in particular, to a specific geographic area, which may be delimited by a mountain range. In part, there is also incoming data from sensors which are not self-monitored, or only self-monitored to a restricted extent, and which may possibly only supply incomplete data. In particular, data can also arrive with a time delay, such that they provide information about sightings which, for example, date back 10 to 30 seconds. Particularly when these measurements relate to regions from which measurement data can otherwise only be obtained sparsely, it is useful also to include these old data in the evaluation.

DE 10 2005 041 705 A1 (Oerlikon Contraves AG) specifies a method for airspace monitoring. In this method, trajectories are established in the various coordinate systems of a plurality of sensors and transferred into the respective next coordinate systems. All trajectories are compared to the measurements in the coordinate system of the sensor considered last.

This conversion is very complicated. Moreover, it is necessary for the measurements of the considered sensors to relate to substantially the same time. The method furthermore assumes that all sensors are substantially of the same type. Therefore, it has little flexibility. By way of example, it is not possible to process data relating to times at which only data from a single sensor are available, nor is it possible to process data that do not directly originate from one of the specific sensors. This firstly leads to a loss of information, accompanied by reduced precision, and secondly requires complicated adaptations in the case of a modification of, or an addition to, the overall system by way of further, in particular different radar stations or by way of additional sensors with a different detection principle. Furthermore, the method assumes that use is made of substantially the same sensors. Taking into account different measurement characteristics or measurement errors of individual sensors is not envisaged.

SUMMARY OF THE INVENTION

It is an object of the invention to develop a method, which is part of the technical field set forth at the outset, for determining trajectories of movable physical objects, and a corresponding arrangement, which have high flexibility and supply results with a high precision.

The solution to the object is defined by the features of Claim 1. In accordance with the invention, the method for determining trajectories of movable physical objects in a space on the basis of sensor data from a plurality of sensors comprises the following steps:
a) generating first data objects based on the sensor data, wherein each first data object comprises at least one timestamp and one location specification of an object detected by at least one of the sensors, and a validation function;
b) providing at least one model object, which represents a parameterization of a trajectory of one of the movable objects with at least one variable parameter;
for the first data objects:
c) calculating a correspondence value for an assignment of the data object to at least one of the model objects provided by way of evaluating the validation function of the data object for the model objects;
d) providing an additional model object and assigning the data object to the additional model object if none of the correspondence values lie in a predetermined range;
e) assigning the data object to the model object provided that corresponds to the best correspondence value if at least one of the correspondence values lies in the predetermined range; and
f) performing a numerical optimization of a target function for the model object to which the data object was assigned, by varying the at least one variable parameter of the model object, wherein the target function is a function of parameter adaptation functions of at least some of the data objects assigned to the model object, and updating the at least one variable parameter of this model object.

An arrangement for determining trajectories of movable physical objects in a space suitable for carrying out the method comprises:
a) a plurality of sensors for detecting the objects in the space;
b) a first processing module for generating first data objects based on the sensor data, wherein each first data object comprises at least one timestamp and one location specification of an object detected by at least one of the sensors, and a validation function;
c) a second processing module for providing at least one model object, which represents a parameterization of a trajectory of one of the movable objects with at least one variable parameter;
d) a third processing module for calculating a correspondence value for an assignment of the data object to at least one of the model objects provided by way of evaluating the validation function of the data object for the model objects;
e) a fourth processing module for providing an additional model object;
f) a fifth processing module for assigning one of the data objects to at least one of the model objects; and
g) a sixth processing module for the numerical optimization of a target function by varying the at least one variable parameter of the model object to which the data object was assigned, wherein the target function is a function of parameter adaptation functions of at least some of the data objects assigned to the model object, and for updating the at least one variable parameter of said model object.

The data objects and model objects are virtual objects within the meaning of object-oriented programming. By way of example, the objects are instances of a data object class or a model object class, wherein all data object classes and model object classes are derived from, in each case, a superordinate pattern (or a base class). In particular, the patterns set the manner in which data can be interchanged between all objects. One or more data object classes and one or more model object classes may be defined. As explained below, each data object and model object can comprise both attributes and methods. By way of example, the methods comprise those for the validation (data object) or for determining the location at a specific time (model object).

Below, a location specification is understood to mean a specification permitting conclusions to be drawn about a whereabouts or location area of an object. In this case, in relation to the three-dimensional space, this can be, in particular, a one-dimensional specification (e.g. angle, distance), a two-dimensional specification (two angles, angle and distance, two distances) or else a three-dimensional specification, which characterizes a point in the space. In addition to location specification, the data objects can also comprise further information obtained from the sensor data, in particular velocity specifications in relation to the objects detected by the sensors.

In particular, a data object comprises those specifications that originate from a measurement of a specific sensor, in particular the corresponding sensor data or information derived therefrom. However, a data object can also already comprise specifications of a plurality of sensors (of the same type or of different types) or about a plurality of measurements; these specifications can also already be preprocessed and/or combined with one another. For generating the data object, the raw data supplied by the actual sensor are usually subjected to preprocessing. The data are, inter alia, validated, normalized, packaged and/or annotated within the scope of this preprocessing. In particular, the preprocessing can be carried out by the sensor and/or by processing means assigned to the sensor.

The correspondence value can always be calculated for all possible assignments of a data object to the model objects provided. However, this is not necessary: for example, the comparison process can be aborted if the correspondence value calculated last achieves a certain quality which allows the conclusion to be drawn with a very high probability that the assignment is correct. It is likewise possible to take into account e.g. external information, which, for example, preclude in advance or suggest an identification of the data object with one or more of the model objects.

The validation functions can be defined in such a way that a high correspondence value corresponds to a high correspondence, that a low correspondence value corresponds to a high correspondence or else that the vicinity to a specific target value (e.g. 0) corresponds to a maximum correspondence. The value can move within a fixed interval; however, it can also be unlimited at one or both sides. Accordingly, different criteria can be used in the test as to whether a correspondence value lies in the predetermined region, for example:

dropping below a maximum value,
exceeding a minimum value,
lying in a predetermined range, etc.

The provision of an additional model object also includes the initialization thereof, i.e. the at least one variable parameter of the new model object is set to an initial value. Particularly if the model object has a relatively large number of parameters, it would appear not to be possible very often to uniquely determine all parameters on the basis of the already assigned data objects. In such cases, it is expedient to set the initial values on the basis of general assumptions. For the initialization, it is also possible initially to use an initial value which is independent of the data objects already assigned. Within the scope of the first optimization of the target function, a value related to the sensor data is then automatically assigned to the at least one parameter of the new model object.

Alternatively or additionally, the number of variable parameters of a model object can be variable. It can then be adapted to the information content of the parameters already assigned to the model object.

As mentioned above, the processed data object is generally assigned to that model object provided which corresponds to the best one of the determined correspondence values. In individual cases, there can be a deviation therefrom. If the sensor data already comprise an assignment to an object (a so-called "track ID"), it is possible, for example, to initially determine the correspondence value in relation to this assignment. If the determined correspondence is good enough, the assignment to the corresponding model object is carried out and further determination of correspondence values remains undone.

The model objects represent the result of the evaluation. They represent at least one parameterization of a trajectory of one of the movable objects with at least one variable parameter. The parameterization is based on approaches known per se, e.g. on splines or similar functions. It is possible to not only establish the current air situation from the model objects, but they also reflect—at least within a given interval—the temporal development to the current time and allow a projection into the future. A systemic time delay can be compensated by a time offset when calculating the current object position (and velocity, etc.).

The target function is generally composed of a plurality of parameter adaptation functions, e.g. as a sum of same. The parameter adaptation function of a data object is, like the validation function, a measure for the correspondence of the sensor data from the data object with the parameters of a model object. In the simplest case, the parameter adaptation function is identical to the validation function. However, it can also be a function of the validation function, or both the validation function and the parameter adaptation function are based on the same basic function, i.e. are, for example, functions of this basic function. The criteria for a high correspondence need not necessarily be the same for the validation function and the parameter adaptation function: for example, a low value of the validation function but a high value of the parameter adaptation function can indicate a high correspondence, etc.

In general, the data objects and model objects will use different (spatial) coordinate systems, and so, advantageously, that coordinate system which is also intended to be used for outputting the results of the evaluation is used in the model objects, for example a stationary, Cartesian coordinate system. By contrast, sensor-dependent coordinate systems can be used in the data objects for the benefit of simpler processing. These systems generally have different origins; moreover, polar or spherical coordinates can be used instead of Cartesian coordinates. A uniform system is advantageously used for the timestamps; however, in principle, it is also possible to use different references in this case. For converting the location specifications and, optionally, the timestamps between the various coordinate systems, additional specifications are required (e.g. the locations of the sensors)—these are preferably part of the data objects such that the specifications required for the conversion between the coordinate systems are also automatically available by the inclusion of a further data object. Continually referring to the necessity of converting between coordinate systems is foregone in the following description. In principle, such a conversion always needs to be undertaken when data specified in different coordinate systems are intended to interact with one another. A person skilled in the art readily identifies such cases; the routines required for the conversion are commonly available. The conversion is advantageously carried out into that coordinate system which simplifies the subsequent processing to the greatest possible extent.

The individual method steps need not necessarily be carried out in the specified sequence. The method is precisely distinguished by virtue of it being possible to process individual data and/or model objects independently of one another, optionally also on separate computers and at different locations. The processing modules can be realized as hardware and/or software. They are usually provided by program modules. The functions of a plurality of the modules can be integrated into a functional unit. By way of example, there may be a single module present, which carries out both the objects of the second processing module and those of the fourth processing module, i.e. it provides the model objects and also generates and initializes new, additional model objects.

Updating the parameters of a model object need not necessarily occur after each reassignment of a data object. The frequency of the parameter adaptation can conform to the incoming data rate, the available processing capacity and/or a prioritization principle.

The optimization of the target function need not be carried out completely in each case; it is possible in each case only to carry out a certain number of iterations in order to obtain a partial (approximate) optimization. Furthermore, a data object can be assigned to a model object for test purposes; subsequently, there can be a parameter adaptation by optimizing the target function, after which a decision is made on the basis of the new correspondence value as to whether the assignment is maintained or undone again. In a preferred embodiment, e.g. the following course of action is carried out, wherein the assumption is made for the sake of simplicity that a low correspondence value corresponds to a high probability of a correct assignment. If the validation functions are defined differently, the method can readily be adapted to this case. Initially, the correspondence values are calculated for all or a subset of the model objects. If the lowest established value lies above an upper threshold, the data object is assigned to a newly generated model object. If the lowest established value lies below a lower threshold, the data object is assigned to the corresponding available model object and subsequently the numerical optimization of the target function of the corresponding model object is likewise carried out for test purposes.

If the lowest established correspondence value lies between the lower and the upper threshold, the data object is initially assigned to the corresponding model object on a temporary basis and then a numerical optimization of the target function of this model object is carried out. If the correspondence value subsequently lies below the lower threshold, there is a definite assignment to this model. If this is not the case, the data object is assigned to the model object with the second-lowest correspondence value for test purposes and the target function of this model object is optimized for test purposes. This method is continued until a correspondence value emerges below the lower threshold. If no corresponding assignment is found, a new model object is generated.

A number of advantages emerge due to the clear separation, according to the invention, between the sensor data held in the data objects and the models represented by the model objects:

As, firstly, the data generated by the sensors are collected and respectively provided with a timestamp and because, secondly, the comparison with the available model objects assumes no simultaneity, the maximum of the available information can be included in the evaluation at all times. Even incomplete information can contribute to the evaluation results. As a result, the achievable precision is increased. Moreover, the multiplicity of data considered enables plausibility checks or the detection of systematic errors in the sensor data.

At the same time, the necessity of real-time processing is dispensed with. Therefore, even high latency times in the overall system are unproblematic. The clocks of the individual sensors and the display interval can be completely decoupled from one another. Individual items of data can be included with delay in the evaluation without causing problems; no special measures are necessary in order also to integrate these data into the evaluation.

The form of the sensor data held in a specific data object merely requires an adaptation of the validation function of this data object and otherwise it has no effect on the overall method, namely no effect on the employed models for the trajectories. The integration of further sensors, even different types of sensors, is therefore made much easier, it can readily also take place during operation ("plug-and-play"). Furthermore—as explained below—this also renders possible the integration of data that do not emerge from measurements of a sensor. All that is required is a fitting validation function.

The performance of the method can easily be increased due to the late bringing together of data and models, and the lack of necessity of real-time processing: thus, it is readily possible to distribute the data processing to a plurality of units; by way of example, individual or all sensors stations can already carry out preprocessing. In a similar way, the method can readily be parallelized. Both render it possible to include, as a matter of principle, all usable data into the evaluation and hence maximize the precision.

Individual program routines for evaluating sensor raw data and for generating data objects, which can be used in the method according to the invention and in the arrangement according to the invention, can be provided from various parties. Linking these routines with one or more routines which provide the model object does not even require the presence of the source code of the individual program parts; the individual routines can even only be connected to one another at the run-time of the software. The individual routines can be developed independently of one another; new versions can be introduced independently of the other program parts.

Correspondingly, compared to conventional methods and systems for data fusion, the method according to the invention and the arrangement according to the invention have very high flexibility and allow precise results to be obtained. At best, increased requirements in relation to the processing capacity of the employed data processing means can easily be picked up.

Preferably, the validation function of the first data objects supplies a value which is a measure for a probability that a considered one of the model objects corresponds to a physical object in the observed space, which physical object is represented by the data of the data object.

The application of the validation function of the first data object on a model object means that the expected whereabouts of the object represented by the model object at the time of the measurement represented by the first data object is calculated initially on the basis of the trajectory which is parameterized by the model object. Then, the validation function supplies a statement, dependent on this whereabouts, about the probability that the sensor data represented by the data object trace back to the object represented by the model object.

In particular, use is made of a maximum likelihood method, wherein the validation function is proportional to the logarithm of a probability density as a function of the whereabouts of a detected object. Then, the summing of a plurality of validation functions correctly corresponds to the multiplication of a plurality of probabilities. The probability density function emerges from the properties of the sensor or sensors, which has/have supplied the sensor data which underlie the corresponding first data object. By selecting an appropriate probability density function, it is possible to account for the properties of the sensors, e.g. the directional and/or distance dependency of the sensitivity thereof, the measurement errors thereof, etc.

The method according to the invention and the arrangement according to the invention are particularly advantageous for processing radar data. Therefore, the sensor data are, in particular, radar data, in particular distance and angle information from a plurality of search radars that are spaced apart in space. As a result of fusing the sensor data, it is possible to obtain information about the whereabouts of the objects (including height), the velocity and movement direction thereof, the object type etc. In principle, it is possible to obtain a complete and uniform air situation picture.

Advantageously, second data objects are additionally provided and assigned to one or more model objects, wherein these second data objects represent previously known information, in particular in respect of realistic whereabouts and/or suspected future events, or boundary conditions in relation to possible trajectories, in particular maximum speeds or accelerations.

The second data objects enable a simple integration of information, which does not originate from sensors and supplies the location specifications and timestamps. In particular, this relates to one or more of the following items of information:

a) data in relation to the topography of the monitored region: the possible whereabouts of a flying object are e.g. restricted to regions of space which are not taken up by mountains or hills; the possible whereabouts of a land vehicle are restricted to positions on the ground, etc.;
b) data in relation to known or assumed future movements of the monitored physical objects, e.g. the knowledge or assumption that a flying object is in an approach for a landing or in a different maneuver;
c) data in relation to possible trajectories of a specific class of monitored objects, e.g. maximum (possibly also minimum) velocities or accelerations of flying objects or land vehicles, including rates of climb, curve velocities etc., or flight altitudes;
d) general data from third sources, which are relevant for establishing the trajectory and/or the assignment of the data objects to the model objects, e.g. for trajectories or assignments of objects which are known due to external data sources. This also includes information which is fed manually into the system by operators of the evaluation system.

The provision and processing of such second data objects does not require any adaptation of the basic functionality of the method according to the invention and the arrangement according to the invention. Thus, external information can easily be integrated into the evaluation, readily also during operation of the system. Information in accordance with points b) and c) additionally supplies a basis for determining an intended maneuver or the class of the object by virtue of it being possible in a manner analogous to validating the first data objects to validate various maneuvers and/or object classes. In the case of a good correspondence between a specific maneuver or a specific object class, this can be displayed for the user and/or a parameter is set to a corresponding value in the model.

Accordingly, the validation function of at least one of the second data objects preferably supplies a value which is a measure for a probability that a considered one of the model objects corresponds to a physical object in the observed space, which physical object is compatible with the data from the data object.

Thus, the validation function of a data object, which represents data in relation to the topography, will exhibit a low correspondence if a trajectory intersects an inadmissible spatial region. The validation function of a data object, which represents data in relation to known or assumed future movements, will exhibit a high correspondence if a model object parameterizes a trajectory corresponding to these movements. Furthermore, the validation function of a data object, which e.g. represents minimum and maximum velocities of a class of flying objects and maximum possible accelerations, will exhibit a low correspondence if the velocity region is exceeded or undershot by the trajectory of a model object and/or if the maximum acceleration is exceeded. The evaluation of the validation function can be restricted to cases in which a class (e.g. fighter jet, helicopter, propeller plane, etc.) is already assigned to the model object by way of an appropriate parameter, which class corresponds to the class represented by the data object, or if no class has yet been assigned to the model object.

The validation functions of the second data objects are included into the target function of the optimization, like those from the first data objects. By way of example, if it is known that an object is in a specific maneuver (e.g. an approach for a landing), this supplies additional conditions when determining the most probable trajectory.

In the case of a (search) radar, various interference effects, which are directly linked with a target to be detected, may occur, in particular the following:

a. diffraction of the radar beam by the atmosphere due to an inhomogeneous density of the air (this effect is partly dependent upon the weather and occurs e.g. more often in inversion situations);
b. the induction of clutter (unwanted radar echoes which are produced due to the presence of a target object, see below);
c. reflections, e.g. at bodies of water or glaciers;
d. "bending" of the radar beam as a result of the latter preferably moving along surfaces, as is generally the case for electromagnetic propagation. By way of example, this effect occurs if the radar beam extends parallel to a hillside and said hillside has a slight curvature.

Here, "induced clutter" should be understood to mean the following: in principle, unwanted reflections occur during radar measurements. These are referred to as "clutter". There is ground clutter, but also clutter in the air (e.g. in the case of rain or snow). An important object of a radar is to suppress the clutter. In the case of ground clutter, the fact that the latter does not move in relation to the radar, and therefore does not exhibit a Doppler shift, is employed. A so-called moving target indicator (MTI) specifies whether a detected target moves. Another strategy lies in the use of clutter maps, on the basis of which the sensitivity of the system may be reduced or the build up of new tracks may be prevented in regions in which clutter is increasingly expected, or in fact detected. This handling of clutter is implemented before the data is supplied to the method according to the invention. If a target is moving in a clutter region, the radar echoes have a Doppler shift. This renders the work of the MTI more difficult since there is always a certain amount of mixing between individual echoes. Thus, the presence of the target may lead to the clutter suppression of the radar processing working less well and false targets being generated, i.e. clutter being "induced". This happens, in particular, if the Doppler shift is relatively small and the intensity of the actual clutter is high. The false targets are forwarded to the method according to the invention in a manner analogous to the real targets.

In a preferred embodiment, model-assisted mapping to temporal and/or spatial specifications is applied for evaluating the validation function of the data object for the model objects and for calculating at least one of the parameter adaptation functions, wherein the employed model models interference effects which influence the sensor data detected by the corresponding sensor.

As a result, the aforementioned interference effects can be corrected in a simple and efficient manner. A clearly defined state of the target (e.g. in respect of location and velocity) is present when evaluating the validation function or during an iteration step of the numerical optimization. As a result of this, the model calculation can be used to calculate which radar datum would emerge if the corresponding effect occurs. This radar datum is then compared with the actual radar datum within the scope of calculating the correspondence value or calculating the target function.

The data object calculates a comparison sensor datum from the position of the target (in the spatial and/or velocity space) by way of a mapping mechanism. If special effects are intended to be taken into account, this mapping mechanism can be modified. This results in a correspondingly modified cost term in the correspondence value or in the parameter adaptation function. Whether a modified mapping mechanism is used may be decided from case to case on the basis of the underlying data. However, it is important that this decision is maintained for all iterations of a numerical optimization, i.e. that the target function does not change during the optimization.

In principle, the mapping can selectively take place on the level of the trajectory parameterized by the model object, namely by adapting the position established in accordance with the modeled trajectory, or on the level of the sensor data, by way of the correction of the measured variables.

In order to detect interference effects, which lead to multiplication of signals of a physical object to be detected, the model-assisted mapping can preferably generate two or more images.

Such multiplications occur, in particular, in the case of reflections, e.g. at bodies of water or glaciers. Depending on the topography, an object may be reflected a number of times such that there is not only doubling, but also the production of two or more images.

In such cases, the model-assisted mapping generates a plurality of comparison data by various defined mapping mechanisms. Two or more cost terms result correspondingly for the correspondence value and the target function. These are added.

As a result, radar data caused by mirroring are not simply discarded and nor do even cause the generation of a further model object; instead, they are included actively and in a natural manner in the evaluation. Ultimately, it appears as if another additional sensor (namely the mirrored sensor) would supply data. The fact that the radial component of the velocity (which is usually available as a component of the sensor datum) points in a different direction is also of particular interest here. This information can be evaluated as a matter of principle and it can be used to improve the determined trajectories.

Errors may occur during radar measurements which, compared to the updating rate of the sensor, only change slowly; i.e., for example, they are approximately constant over a number of seconds, so-called "systematic errors". By way of example, the following systematic errors have the following effect on the measured azimuth:
1. an incorrect North setup of the system;
2. an incorrect assumption about the absolute position of the system in the terrain;
3. an inaccurate mechanical adjustment within the mechanics of the system;
4. radar glint and further effects during the wave propagation;
5. an offset in the timestamp.

In the last point, an azimuth error emerges indirectly because the assumption of an exact timestamp is generally made. When a target flies past, a time offset has a very similar effect to an azimuth offset.

What effect these sources of error have on the azimuth depends on additional parameters and differs for the expected errors. Thus, an incorrect North alignment always causes the same offset, whereas the offset depends on the relative position between sensor and target in the case of an incorrectly assumed position, on the observation angle and the structure of the target and the terrain between sensor and target in the case of the azimuth errors connected with the wave propagation and on the tangential speed in the case of an offset in the timestamp.

In the case of a further preferred embodiment, the target function now comprises a function for the numerical optimization which links the sensor data representing different times from the same sensor, wherein the function is defined in such a way that unchanging influences of systematic errors on the sensor data of the various times are preferred in the numerical optimization.

In this way, systematic errors can also be handled in a simple manner.

The fact that the above-described framework only changes insubstantially during one antenna rotation of approximately one second is used. This means that the component of the azimuth error caused by the systematic error is approximately the same in two successive echoes from the same target. When taking the difference of these two errors, this portion of the systematic error disappears and a difference of two random errors remains, which, in the case of an assumed normal distribution, has a width of $$\sigma_{12}=\sqrt{\sigma_1^2+\sigma_2^2}=\sqrt{2}\cdot\sigma_z,$$

where $\sigma_1=\sigma_2=\sigma_z$ is the random error of the individual measurement. In general, $\sigma_{12}$ is substantially smaller than the overall error (i.e. including systematic errors) in practice.

In the case of a parameter adaptation, in which a plurality of data from the same sensor is included, it is now possible, in particular, to proceed as follows, with selected pairs of sensor data (e.g. immediately successive values) being used:

1. query the target positions $\vec{x}_1$ and $\vec{x}_2$ at the validity times $t_1$ and $t_2$ from the sensor data 1 and 2
2. calculate the corresponding azimuth values: $\vec{x}_1 \rightarrow \alpha_1$, $\vec{x}_2 \rightarrow \alpha_2$
3. calculate the deviations from the measured azimuth values $A_1$ and $A_2$: $\Delta A_i = A_i - \alpha_i$
4. calculate the difference of these deviations: $X = \Delta A_1 - \Delta A_2$
5. calculate a cost term of the target function (e.g. a normal distribution with $\sigma_{12}$, see above, or the negative logarithm thereof, depending on the definition of the target function)

By way of example, this cost term can always be added when calculating the conventional cost term of the second sensor datum. Alternatively, use can be made of a specific data object for the pairwise consideration of sensor data. For the first case, it is merely necessary to provide the option of a data object obtaining access to the preceding data object thereof by way of the target model.

Taking into account the systematic azimuth error was shown using the example. There can be an analogous procedure for the other components and the covariance. Furthermore, it is also possible to use more than two sensor data objects from the same sensor (i.e. more than two time points). The parameters of the target function can be determined by the statistical evaluation of radar data with a known target position (e.g. known by GPS trackers), like the parameters of the conventional density functions, by virtue of measured values being compared to one another in a pairwise manner in a manner similar to that carried out during the operation of the method.

Alternatively or additionally, systematic errors can also be considered statistically in a manner known per se.

Advantageously, a reference is respectively transferred to the respective model object for calculating the correspondence values of the relevant data objects such that the data of the model object are accessible to the validation function (and optionally the parameter adaptation function) of the data object. This simplifies the implementation of the method and can greatly reduce the data volume to be processed. Furthermore, the program routine which evaluates the sensor data and provides the appropriate data objects has full access in each case to the information of the model object; therefore, it can query precisely the (spatial) coordinates relevant to the corresponding sensor, and also further information such as e.g. a maximum occurred velocity and/or acceleration, a spatial curve, etc. By way of example, the additional information is useful if there should be an assignment of a model object to a specific object type or if a check is to be carried out as to whether the modeled spatial curve passes through unrealistic regions.

Alternatively, it is possible to transmit as values the information (parameters of the parameterization, functional values etc.) required by the data objects to the data objects.

Preferably, the model objects comprise further parameters, which describe properties of the modeled object, in particular represent an object type and/or specify physical properties of the object.

As a result, the method according to the invention and the arrangement according to the invention render possible not only the establishment of trajectories but also, for example, the assignment of specific classes (e.g. fighter jet, helicopter, propeller plane; passenger car, truck, motorcycle, etc.) to the monitored physical objects or the establishment of other properties of the physical objects (e.g. extent thereof in terms of volume or area, the drag coefficient or the visibility for a specific class of sensors). These parameters are included when modeling the trajectory and/or taken into account when evaluating the validation function.

Preferably, conditioning of the target function of the optimization is carried out for the numerical optimization of the correspondence value. To this end, the parameter adaptation function of at least one of the first data objects is modified in such a way that, independently of the unmodified parameter adaptation function, a gradient of the modified parameter adaptation function has a magnitude in a predetermined range, except for in a region of the parameter space corresponding to a spatial region which surrounds the location that is expected on the basis of the data object.

The parameter space is not restricted to spatial coordinates but can rather comprise additional coordinates, e.g. velocity coordinates. Accordingly, the mentioned region lies in an area of the parameter space that surrounds the point or the region of the parameter space corresponding to the location expected on the basis of the data object and the velocity expected on the basis of the data object.

As a matter of principle, the area of the parameter space can be alternatively defined both in terms of the parameter coordinates of the model object and in terms of spatial coordinates and possibly velocity coordinates (e.g. in accordance with the sensor data of the data object). Usually, the mutually corresponding areas will be contiguous in each case.

It was found that additional information in relation to the quality of the optimization could be obtained more easily, or even at all, from the conditioned target function. By way of example, it is possible to determine within the scope of the method, mentioned at the outset, for determining trajectories of movable physical objects that the assignments are to be checked because no clear situation is present. Without conditioning, this information can hardly be gathered from the target function, or only with great difficulties.

Advantageously, the conditioning comprises the flowing steps:
a) cutting off an unmodified parameter adaptation function along a boundary which corresponds to a lower bound of a probability of presence;
b) complementing the resulting function by an auxiliary function such that the gradient of the modified parameter adaptation function has the magnitude in the predetermined range, except for in a region within the boundary.

Advantageously, except for a first constant term, the modified parameter adaptation function is substantially proportional to the logarithm of a probability of presence at the corresponding location at locations at which an object was present with a high probability at the considered time on the basis of the data object. Moreover, except for a second constant term, the modified validation function at locations with a low probability of presence is preferably at least approximately proportional to the distance between said location and a location with a highest probability of presence. Once again, the probability of presence at the appropriate location can also, in generalized fashion, include the probability of a certain speed or velocity of the object.

Qualitatively, the result of the conditioning is that the conditioned function (in particular the minima thereof) corresponds to the logarithm of a probability of presence in a region around the most probable values of the parameters, while the function is substantially linear outside of this region in relation to a (generalized) distance from the location of the highest probability of presence. Speaking in a simplified manner and considered in two dimensions for reasons of clarity, the original parameter adaptation function is thus "cut off" at a certain distance from the expected minimum and replaced outside the cut by a "funnel" attached in a continuous manner to the cut.

In the region of the parameter space which corresponds to the spatial region that surrounds the expected location on the basis of the data object, the modified parameter adaptation function in a preferred embodiment represents a quadratic form of the parameters, which are to be optimized numerically, of the parameter adaptation function. Outside of this region, the magnitude of the gradient of the modified parameter adaptation function is constant or monotonically decreasing with increasing distance from the region.

The distance relates to the parameter space and emerges on the basis of a suitable metric. By way of example, it can be given by the root of the quadratic form.

Preferably, the modified parameter adaptation function $P_{mod}(\vec{x})$ for conditioning the target function is constructed as follows:

$$P_{mod}(\vec{x}) = R(\vec{x}) + \frac{1}{W}\sqrt{-\log(PDF'(\vec{x}))}.$$

Here, $PDF'(\vec{x})$ is a probability density function with a suitable normalization which, in particular, is selected in such a way that $PDF'(\vec{x}) \leq 1$ applies for all $\vec{x}$. The following applies to $R(\vec{x})$:

a) $R(\vec{x})$ is proportional to $-\log(PDF'(\vec{x}))$ within the region of the parameter space which corresponds to the spatial region that surrounds the expected location on the basis of the data object.
b) $R(\vec{x})$ is constant outside of the region of the parameter space which corresponds to the spatial region that surrounds the expected location on the basis of the data object.

W is a predeterminable parameter. It defines the gradient of the overall function in the outer "funnel region". In view of the numerical optimization, it is selected in such a way that the functional value of the target function remains within a predetermined range in the whole region considered. As a result, the available floating-point accuracy can be used in an ideal manner.

What is avoided thereby is that the minimal detectable distance between two function values needs to be increased due to large function values. Expressed slightly more simply, what is avoided is that decimal places need to be sacrificed for required integer places.

A possible criterion for the value of W is $$\frac{1}{W}\sqrt{-\log(PDF'(\vec{x}))} \le S^2$$

for all $\vec{x}$ within the monitored space.

Alternatively, a smallest spatial distance (e.g. 1 cm) which should still bring about a change in the functional value within the scope of floating-point accuracy is predetermined. This likewise defines the gradient in the "funnel region" and hence the value of the parameter W.

The function $R(\vec{x})$ is advantageously defined as follows:

$$R(\vec{x}) = -2\log(PDF'(\vec{x})) \text{ for } -2\log(PDF'(\vec{x})) < S^2 \text{ and}$$

$$R(\vec{x}) = S^2 \text{ for } -2\log(PDF'(\vec{x})) \ge S^2,$$

where S is a predeterminable parameter. S is a measure for the extent of the inner region, in which the modified parameter adaptation function $P_{mod}(\vec{x})$ is dominated by the term proportional to $-\log(PFD'(\vec{x}))$. If the probability density function corresponds to a (multivariate) normal distribution $$PDF(\vec{x}) = \frac{1}{(2\pi)^{\frac{p}{2}}|\Sigma|^{\frac{1}{2}}}\exp\left\{-\frac{1}{2}(\vec{x}-\vec{\mu})^T\Sigma^{-1}(\vec{x}-\vec{\mu})\right\},$$

then $$PDF'(\vec{x}) = \exp\left\{-\frac{1}{2}(\vec{x}-\vec{\mu})^T(\vec{x}-\vec{\mu})\right\}$$

and the conditioning is defined in such a way that the value of S precisely specifies the number of standard deviations of the multivariate normal distribution, to which the distance of the boundary between the inner and outer region of the expected minimum corresponds. By way of example, if a value of 3 is selected for S, the cutoff is carried out at a distance of 3σ. It should be noted that the cut criterion can be generalized, in particular by virtue of the value S being dependent on an angle in the parameter space; accordingly, different values of S are selectable for different parameters.

Not all parameter adaptation functions considered in the target function must be conditioned in the same way. By way of example, it is sufficient for the funnel term only to be added in one of the parameter adaptation functions included in the optimization, while only the cutting off is carried out in all other parameter adaptation functions.

Furthermore, the conditioning can also be undertaken in a different way. Thus, the funnel term can also be defined in the model parameter space rather than in the sensor data space. The zero point thereof is given by the location in the parameter space which is determined by the model parameters a. Hence, such conditioning is expedient, in particular, if meaningful parameters were already established, e.g. on the basis of earlier received sensor data.

The parameters S and W can be modifiable within the scope of the method, to be precise manually by a user and/or automatically on the basis of corresponding algorithms, depending on the requirements. The extent to which such modifiability provides advantages is set forth below.

Advantageously, the numerical optimization is implemented using one of the following methods:
i. a downhill simplex method;
ii. a gradient-based method.

In these methods, the conditioning described above is additionally advantageous in that it provides a target function which, in terms of value, only extends over a restricted range over the whole parameter region captured by the optimization methods. However, the unconditioned function can extend over a much larger value range, for example because it grows strongly for unrealistic parameter combinations (e.g. substantially in a quadratic manner with increasing distance from the expected parameter range). Consequently, the result of this is a greater minimal step width within the scope of a predetermined floating-point accuracy, which may lead to the optimization method working less efficiently, supplying a less exact result or even coming unstuck in view of the optimization problem.

It should be noted that the conditioning of the target function described above is not restricted to the use in the method, set forth at the outset, for determining trajectories of movable physical objects. It can be used in a multiplicity of ways to improve the analysis of the parameter space and/or the behavior of an optimization function. The conditioning is particularly effective if hints in relation to a probable region in the parameter space already emerge from the individual data objects, the parameter adaptation function of which is conditioned. As a result of the conditioning, the information in this region is kept, while it is replaced outside of the region, which corresponds to unrealistic parameter combinations, by a function that is more easily manageable, that influences the minimization less and that simplifies the optimization.

Thus, in general, a method is useful, in which conditioning of the target function of the optimization is undertaken for numerical optimization of the correspondence value by virtue of a parameter adaptation function influencing the target function being modified in such a way that, independently of the unmodified parameter adaptation function, a gradient of the modified parameter adaptation function has a magnitude in a predetermined range except for in a region of the parameter space corresponding to an area of the parameter space surrounding the expected parameter combination.

Advantageously, the arrangement has a sensor station, which comprises the following:
a) at least one of the sensors for detecting the objects in the space; and
b) the first processing module for generating first data objects based on the sensor data, wherein each first data object comprises at least one timestamp and one location specification of the object detected by the at least one sensor, and a validation function.

Thus, the sensor station supplies not only raw data but also, in particular, the validation function which is used within the scope of assigning the model objects. In particular, the validation function can be evaluated within the sensor station in such a way that technical details such as the specific form of the validation function do not need to be stored centrally or transmitted over a network. Moreover, a central site, which evaluates the data from a plurality of sensor stations, does not need to obtain or store individual functions or settings for the individual stations. Due to the aforementioned advantages, such a sensor station with means for generating data objects, which in addition to a timestamp and location specification also comprise a validation function, is also advantageous in arrangements for determining trajectories of movable physical objects in a space which do not comprise all the processing modules listed above.

Therefore, the processing station advantageously comprises the following:
a) the second processing module for providing the at least one model object;
b) the third processing module for calculating the correspondence value;
c) the fourth processing module for providing the additional model object;
d) the fifth processing module for assigning one of the data objects to at least one of the model objects; and
e) the sixth processing module for the numerical optimization of the target function,
wherein the arrangement furthermore comprises a network for connecting the sensor station with the processing station.

The division of the individual modules between the various locations and stations can also be selected differently. In general, the data can be processed centrally, in a single processing station. However, it is also possible to provide a plurality of processing stations, for example by virtue of individual, or all, sensors being combined with a processing station which, for example, preprocesses the data detected by the sensor.

The amount of data to be interchanged between the processing station and the sensor stations can be reduced by virtue of the validation function and, in particular, the parameter adaptation function being approximated by a Taylor expansion. What applies to the parameter adaptation function is that the constant terms are without meaning and can be omitted. If work is undertaken with normal distributions, the third order terms and higher are zero, and the terms of higher order are also only of secondary importance in other distributions.

Hence, for a given initial point $\vec{x}_0$ in the reference coordinate system, the parameter adaptation function of the data object i therefore has the following form:

$$P_i(d\vec{x}) = \tfrac{1}{2}(d\vec{x}^T A_i d\vec{x}) + \vec{b}_i \cdot d\vec{x}, \text{ with } d\vec{x} := \vec{x} - \vec{x}_0.$$

Thus, the following applies to the target function:

$$Q(d\vec{x}) = \sum_i P_i(d\vec{x}) = \frac{1}{2}(d\vec{x}^T A d\vec{x}) + \vec{b} \cdot d\vec{x}, \text{ with}$$
$$A := \sum_i A_i \text{ and } b := \sum_i b_i.$$

Therefore, A and b only need to be calculated once per parameter adaptation; moreover, Q always has the same simple form, independently of the number of data objects being considered: Q is a quadratic form, which can be minimized very efficiently with the method of conjugate gradients.

Therefore, from the data objects, the matrix A and the vector b only need to be calculated and transmitted once in each parameter adaptation, as a result of which the data volume can be massively reduced.

Further advantageous embodiments and feature combinations of the invention emerge from the following detailed description and the totality of the patent claims.

BRIEF DESCRIPTION OF THE DRAWINGS

In the drawings used to explain the exemplary embodiment.

In principle, the same parts have been provided with the same reference signs in the figures.

WAYS OF IMPLEMENTING THE INVENTION

Figure 1:
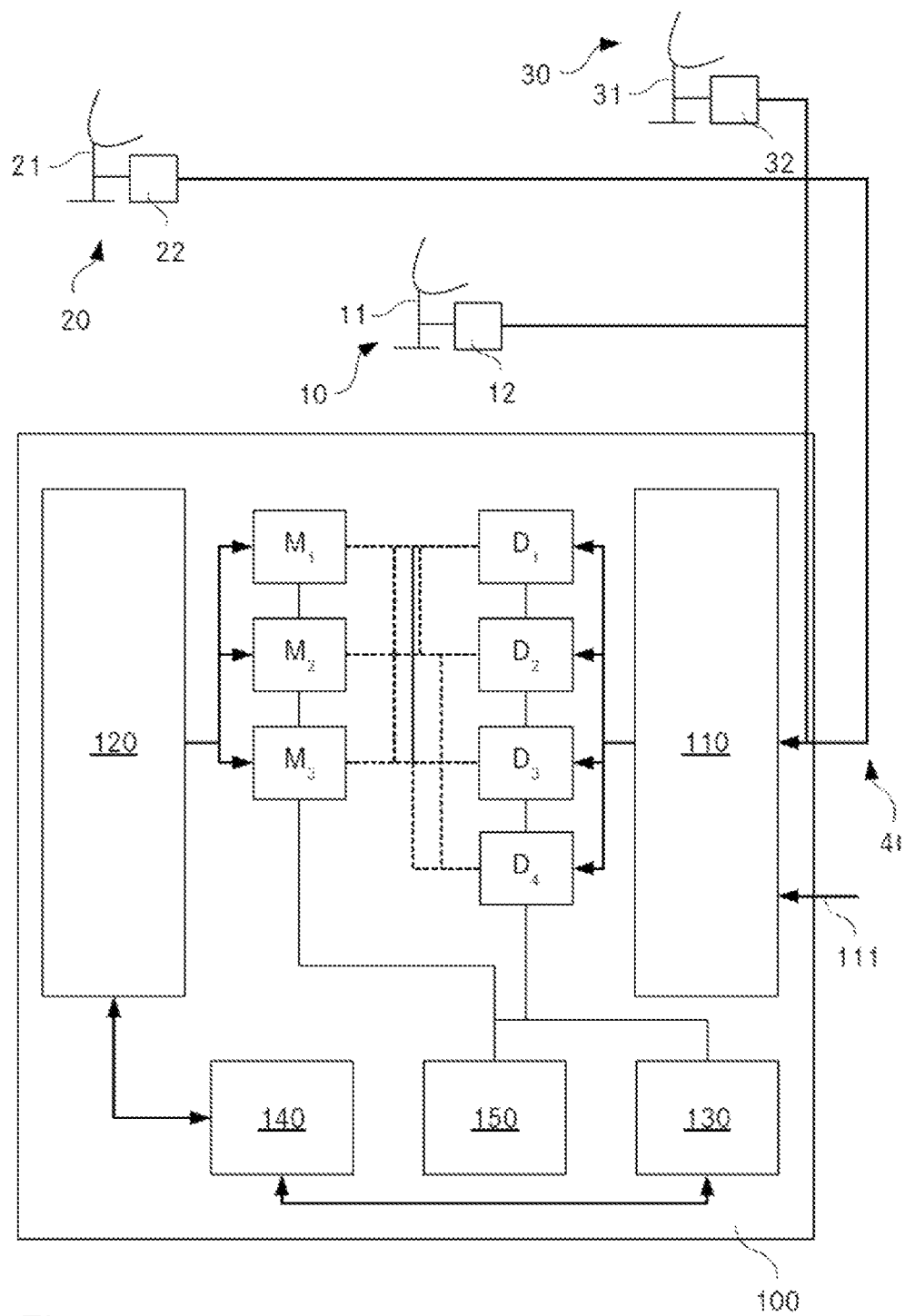
FIG. 1 shows a schematic overview of an arrangement according to the invention for determining trajectories of movable physical objects in a space.
Figure 2:
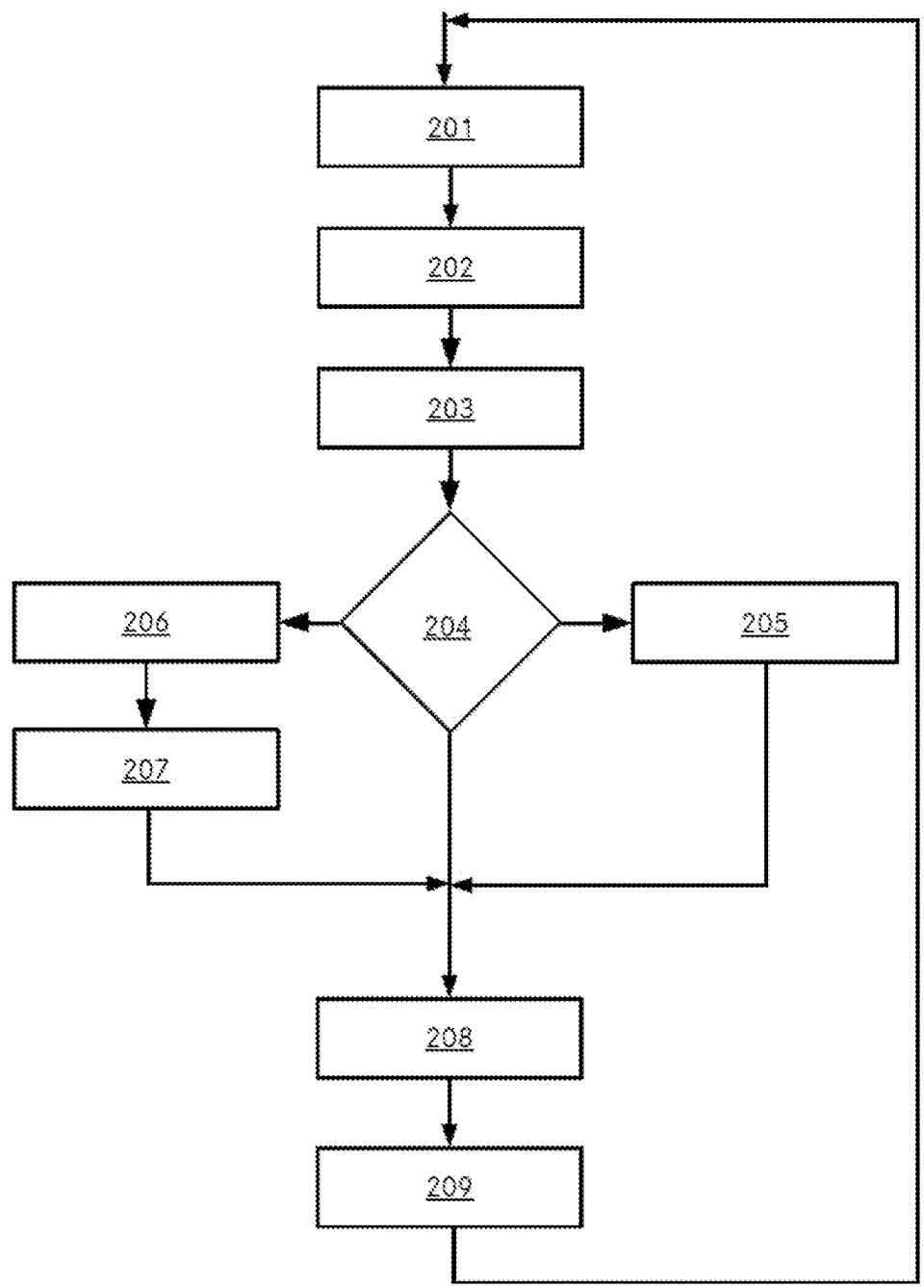
FIG. 2 shows a flowchart for illustrating the progress of the method according to the invention for determining trajectories after the input of new sensor data.

FIG. 1 shows a schematic overview of an arrangement according to the invention for determining trajectories of movable physical objects in a space. Here, this is an arrangement for establishing the current air situation on the basis of radar data. FIG. 2 is a flowchart which shows the steps of the method according to the invention for determining trajectories, which are carried out after new sensor data have arrived.

The arrangement comprises a plurality of sensor stations 10, 20, 30, with respectively one search radar 11, 21, 31 and one processing apparatus 12, 22, 32. The sensor stations 10, 20, 30 are connected to a central evaluation station 100 by way of a network 40. In principle, the network 40 can comprise any connections, such as e.g. copper cables or optical fiber cables, directional beam connections or other radio connections. The data can also be transmitted, wholly or in part, between the sensor stations 10, 20, 30 and the central evaluation station 100 by way of existing networks such as cellular telephone networks, conventional telephone networks, the Internet, etc.

The central evaluation station 100 comprises interfaces for data interchange with the sensor stations 10, 20, 30, at least one computer, on which a program providing the functionalities outlined below is executed, and output means for forwarding, storing or displaying the results of the evaluation, e.g. monitors, printers, mass storage devices, network interfaces etc. Furthermore, there are input means for controlling the evaluation and the data output and for entering additional information, e.g. a keyboard, a touchscreen, other input devices or (further) network interfaces.

The block diagram, shown in FIG. 1, of the central evaluation station 100 is oriented on the function of same. The depicted modules and objects and the connections therebetween generally do not correspond to the hardware architecture of the evaluation station 100. By way of example, said hardware architecture can be realized by a commercially available server, on which computer programs which provide the described functionalities are executed.

The central evaluation station 100 comprises a first generation module 110 for generating data objects $D_1 \ldots D_4$. To this end, it receives information from the sensor stations 10, 20, 30, and also from further sources, by way of the input 111 (step 201). In the depicted exemplary embodiment, the measurement data from the search radars 11, 21, 31 are already processed by the processing apparatuses 12, 22, 32 in such a way that respectively one azimuth φ and one distance r are output as a location specification, together with a timestamp t of the corresponding measurement, by the sensor station 10, 20, 30 for each detected object. The location specification as combination of azimuth φ and distance r is also denoted by d (for sensor datum) below.

The generation module 110 generates data objects $D_1 \ldots D_4$ (step 202). These represent either sensor data, i.e. the timestamps and location specifications t, d obtained by the sensor stations 10, 20, 30, or external data, such as topography data, conditions for valid trajectories or, in general, further data which are important for establishing the air situation and which do not correspond to the timestamps and location specifications t, d supplied by the sensor stations 10, 20, 30. In general, the data objects $D_1 \ldots D_4$, which represent sensor data, additionally also comprise sensor parameters (e.g. the location of the sensor station 10, 20, 30, a velocity in the case of mobile stations, etc.). Furthermore, each data object $D_1 \ldots D_4$ comprises a validation function. In the case of the data objects $D_1 \ldots D_4$ which comprise sensor data, a probability density function $PDF(x, t_i, d_i, k_i)$ is assumed, said probability density function representing the measurement characteristics of the corresponding sensor station 10, 20, 30. Thus, it assigns the probability density for the presence of the object represented by the sensor datum t, d at a location to each location x at a given time t. The parameters k relate to properties of the sensor, from which the sensor datum originates, e.g. the location thereof, the measurement accuracy thereof, etc. A circular arc emerges from the sensor position and the measured azimuth φ and the distance r. By way of example, the probability density function now has a maximum at a location which lies on this circular arc and the elevation of which corresponds to the maximum sensitivity of the corresponding search radar 11, 21, 31. Proceeding from this point, the probability density decreases, for example in accordance with a multivariate normal distribution, wherein the function will generally have a different width in different directions (radius, azimuth, elevation). In order to reflect the sensor characteristic to the best possible extent, the distribution can deviate from a normal distribution in one, some or all dimensions; by way of example, the probability distribution depending on the elevation can be defined differently.

The probability density function substantially has the following form:

$$PDF'(x, t_i, d_i, k_i) = \exp(-\tfrac{1}{2} L(x, t_i, d_i, k_i)),$$

where the function is normalized in such a way that it assumes a value of 1 at the maximum.

The validation function of the data object $D_i$ is then, for example, defined as follows:

$$V_i(x, t) = \sqrt{L_i(x, t)}.$$

The central evaluation station 100 furthermore comprises a second generation module 120 for generating and updating model objects $M_1 \ldots M_3$. Each model object $M_1 \ldots M_3$ represents a parameterization of a trajectory of a movable object. To this end, it comprises at least one parameter a (in general, it comprises a plurality of parameters). The parameterization is, in particular, a position function which returns the location of the modeled object at the specified time in a manner dependent on the time and at least some of the parameters. Further parameters can describe properties of the modeled object which do not influence the position function but are nevertheless important for the assignment to the individual models, e.g. the class (e.g. flying object, land vehicle, stationary object), the type (e.g. fighter jet, passenger plane, helicopter) or an identification of the object (e.g. friend, foe, controlled by pilots, independent, etc.).

Furthermore, the model objects $M_1 \ldots M_3$ comprise references to one or more data objects $D_1 \ldots D_4$. This is indicated by the dashed lines between the model objects $M_1 \ldots M_3$ and the data objects $D_1 \ldots D_4$.

The central evaluation station 100 furthermore comprises a calculation module 130 for calculating a correspondence value for an assignment of the data object to at least one of the provided model objects (step 203). To this end, the validation function $V_i(x,t)$ of the data object $D_i$ is evaluated for the respective model object $M_k$. This means that the location x of the object at the time t is determined in accordance with the position function of the model object $M_k$. The probability of presence of the detected object, which is represented by the data object $D_i$, at this location influences the result of the validation function by way of the probability density function in the validation function of the data object $D_i$. Consequently, the value of the validation function, the so-called correspondence value $V_{ik}$, specifies how likely it is that the model object $M_k$ corresponds to the object represented by the data object $D_i$. In the present case, a low value indicates a high probability of the appropriate assignment due to the definition of the validation function $V_i(x,t)$.

The central evaluation station 100 furthermore comprises a decision module 140, which makes a decision on the basis of the correspondence values calculated by the calculation module 130 as to which model object $M_1 \ldots M_3$ is intended to be assigned to a specific data object $D_i$ or as to whether the second generation module 120 should provide a new model object $M_j$ (decision 204). By way of example, this decision is made as follows (k=1 ... m):

a. $\min(V_{ik}) < V_{min}$: Assigning the model object k with $V_{ik} = \min(V_{ik})$ (step 205);
b. $\min(V_{ik}) \geq V_{min}$: Generating a new model object $M_{m+1}$ (step 206), assigning this new model object $M_{m+1}$ (step 207).

Here, $\min(V_{ik})$ denotes the minimum value of the validation function over the tested models k=1 ... m and $V_{min}$ denotes a lower threshold, which must be undershot so that an assignment to an already existing object can be undertaken.

The assignment of a model object to a data object is carried out by virtue of a reference to the corresponding data object being added to the model object, i.e. the model object is appropriately updated by the second generation module 120.

The central evaluation station 100 furthermore comprises an optimization module 150. The latter optimizes a target function Q, which ultimately is a measure for the deviations of the measured values represented by the data objects $D_i$ from the parameterized trajectory of the model $M_k$. To this end, the following term is considered in the present exemplary embodiment:

$$Q = \sum_i P_{ik},$$

where $P_{ik}$ denotes a suitable parameter adaptation function. Here, the sum is made over all data objects, to which the model object $M_k$ is assigned, i.e. over all the data objects, the reference of which is stored in the model object $M_k$. In accordance with the exemplary embodiment, the term Q is minimized by varying the parameters a of the model object by means of a downhill-simplex method (step 208).

In the simplest case, the parameter adaptation function $P_{ik}$ simply corresponds to the correspondence value $V_{ik}$. However, conditioning is preferably undertaken. To this end, an auxiliary function is defined as follows in accordance with the exemplary embodiment:

$$R(x, t) = \begin{cases} L(x, t) & \text{if } L(x, t) < S^2 \\ S^2 & \text{otherwise} \end{cases}.$$

The function $P_{ik}$ then emerges as:

$$P_{ik} = R(x, t) + \frac{V_i(x, t)}{W}.$$

Qualitatively, the result of the conditioning is that the conditioned function (in particular the minima thereof) corresponds to the original parameter adaptation function in a region around the most probable values of the location and velocity values, but that the substantially quadratic function is replaced by a linear function, namely the second term of the function $P_{ik}$, in a region of the parameter space which has a certain distance from the most probable values. Speaking in a simplified manner, the original parameter adaptation function is therefore "cut off" at a certain distance from the expected minimum and replaced outside of the cut by a "funnel" placed continuously against the cut.

The parameters W and S parameterize the conditioning. S defines the distance of the cut from the expected point in the parameter space. The conditioning is defined in such a way that the value of S precisely specifies the number of standard deviations of the multivariate normal distribution which corresponds to the distance between the cut and the expected minimum. By way of example, if a value of 3 is selected for S, the cutoff is carried out at a distance of 3σ. It should be noted that the cut criterion can be generalized, particularly by virtue of the value S being dependent on an angle in the parameter space; then, different values of S are accordingly selectable for different parameters. Within the scope of the exemplary embodiment described below in conjunction with FIG. 6 it was found, for example, that the probability that a different assignment should be carried out is greater than that the considered sensor values relate to a location in the parameter space lying in the funnel area in the case of a value of S≈3 or greater.

The value W defines the gradient of the overall function in the outer "funnel region". In view of the numerical optimization, it is selected in such a way that the functional value of the target function in the whole considered area remains in a predetermined range. As a result, the available floating-point accuracy can be used in an ideal manner. What is avoided thereby is that the minimal detectable distance between two function values needs to be increased due to large function values. Expressed slightly more simply, what is avoided is that decimal places need to be sacrificed for required integer places.

As mentioned above, it is not necessary for all parameter adaptation functions considered in the target function to be conditioned in the same manner. By way of example, it is sufficient if the funnel term is only added in one of the parameter adaptation functions influencing the optimization, while only the cutting-off is carried out in all other parameter adaptation functions.

After the optimization has been carried out, the parameters of the model object $M_k$ are adapted accordingly (step 209). The trajectories of the model objects $M_1 \ldots M_3$ and the assignments can respectively be output by way of one or more of the output means.

In principle, the processes carried out by the individual modules can be carried out independently of one another. Thus, the data objects $D_1 \ldots D_4$ can respectively be updated whenever new information comes in and the ideal assignment between the data objects and model objects can be established periodically or after adaptations in respectively one data object or model object. Analogously thereto, the optimization of the parameters of a model can be triggered periodically, when necessary or when certain conditions are satisfied.

Figure 3:
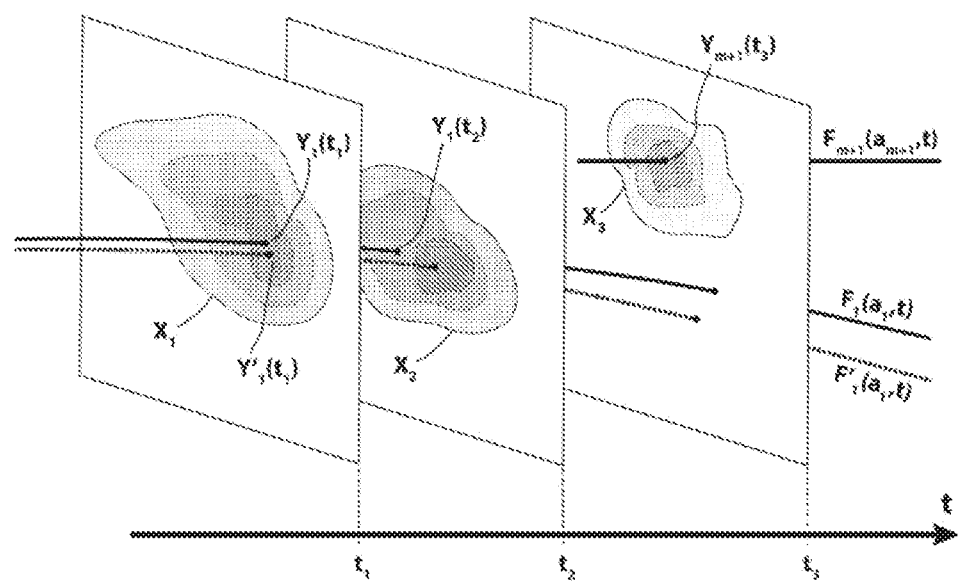
FIG. 3 shows a schematic illustration of determining trajectories.

FIG. 3 is a schematic illustration of the determination of trajectories. A measurement, by means of which an object is detected, is carried out by one of the sensor stations at a time $t_1$. A probability distribution $X_1$ for the whereabouts of the detected object emerges from the measurement. In the figure, this distribution is only depicted in two dimensions in a simplified manner. The differently shaded regions of the depicted plane symbolize regions with different probabilities of presence (dark: high probability density; light: low probability density). Under the assumption that the sensor data can be traced back to an object not detected previously, a new model object $M_1$ is generated.

Initial values are assigned to the parameters of this new model object $M_1$. Said parameters are selected in such a way that the parameterization $F_1(a_1,t)$ as a location $Y_1(t_1)$ at the measurement time $t_1$ provides the maximum of the probability distribution $X_1$. Since a single measurement generally does not uniquely determine the free parameters of the model object, the further parameters are initialized on the basis of assumptions or standard values. The first approximation of the position function $F_1(a_1,t)$ emerges from the initialized parameters.

A further measurement is undertaken by the sensor station at the time $t_2$. There now is an evaluation of the correspondence between the model, which is determined by the position function $F_1(a_1,t)$ of the current parameterization, and the probability distribution $X_2$ emerging from the second measurement. What can be seen from FIG. 3 is that the current trajectory of the model $M_1$ does not extend through the region of maximum probability of presence at the time $t_2$, but the calculated whereabouts $Y_1(t_2)=F_1(a_1, t_2)$ appears compatible with the new measurement data. This also emerges from the calculated correspondence value $V_{21}$. Hence, the available model object $M_1$ is also assigned to the second measurement. Next, there is a numerical optimization of the parameters of the available model object $M_1$. To this end, the aforementioned correspondence value $V_1$ is minimized. From this, new parameters, and hence a new position function $F_1'(a_1,t)$, emerge. As can be seen from the illustration, the corresponding trajectory runs through the regions of maximum probability of presence at the measurements at $t_1$ and at $t_2$.

A further measurement is undertaken by the sensor station at the time $t_3$. There now is, once again, an evaluation of the correspondence between the current model, which is determined by the position function $F_1'(a_1,t)$ of the current parameterization, and the probability distribution $X_3$ emerging from the third measurement. What can be seen from FIG. 3 is that an expected whereabouts emerges in accordance with the current parameterization at the time $t_3$ which is far away from the regions of high probability of presence. This will also emerge when calculating the correspondence value $V_{31}$ between $X_3$ and the parameterization $F_1'$. If no further model object, the parameterization of which supplies a better correspondence value, is available, a new model object $M_{m+1}$ is therefore generated, the parameterization of which corresponds to a new position function $Fm_{+1}(am_{+1},t)$, and this new model object is assigned to the third measurement. This generation and initialization are carried out in the same manner as described above in relation to the first model object. Once again, the initial values of the parameters are selected in such a way that the parameterization $F_{m+1}(a_{m+1},t)$ as a location $Y_{m+1}(t_3)$ at the measurement time $t_3$ provides the maximum of the probability distribution $X_3$.

Since no further measurement data were assigned to the first model object $M_1$ for the time being, a renewed numerical optimization is unnecessary for the time being. The described steps are also carried out for the sensor data subsequently coming in such that the detected situation is always updated.

Figure 4:
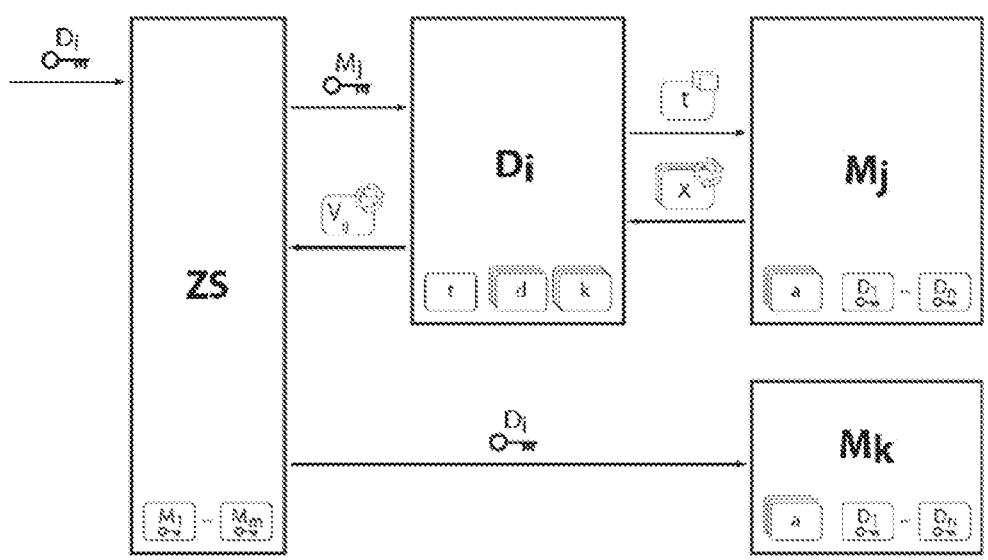
FIG. 4 shows a block diagram illustrating the interaction between a data object and model objects when assigning the data object to one of the model objects.

FIG. 4 is a block diagram which illustrates the interaction between a data object $D_i$ and model objects $M_j$ when assigning the data object $D_i$ to one of the model objects. These functions are provided by the calculation module 130 and the decision module 140 of the arrangement described in conjunction with FIG. 1.

A reference to the data object $D_i$ is transferred to a central controller ZS. The controller successively transfers references to different model objects $M_j$, $j=1, \ldots, m$ to this data object $D_i$. The following process is then carried out for each one of the model objects: the data object $D_i$ supplies the measurement time t to the model object $M_j$. Then, the position function, which is determined by the parameters a, is evaluated at the time t in the model object $M_j$. The resultant location x is returned to the data object $D_i$. The data object then calculates the correspondence value $V_{ij}$ and forwards the latter to the central controller. This corresponds to a statement in relation to how probable it is that the model object $M_j$ corresponds to the object represented by the data object $D_i$.

After running through this process for all model objects $M_j=1, \ldots, m$, the correspondence values are used, as described above, to establish whether the data object $D_i$ is assigned to one of the available model objects or to a new model object $M_k$; subsequently, the assignment is undertaken by transferring a reference in relation to the data object $D_i$ to the model object $M_k$ and storing this reference in the model object $M_k$.

Figure 5A:
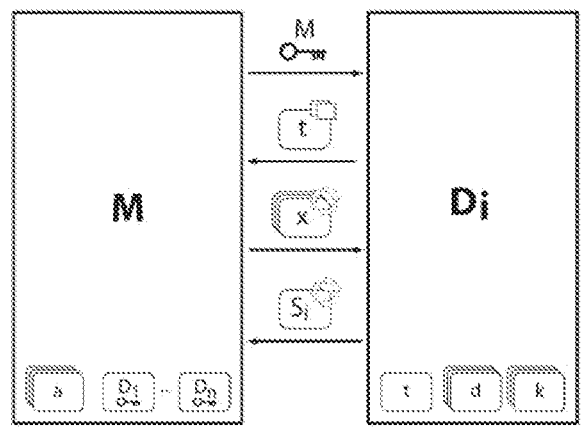
FIGS. 5A, B show block diagrams illustrating the interaction between a model object and the data objects assigned thereto when calculating the target function for the numerical optimization.
Figure 5B:
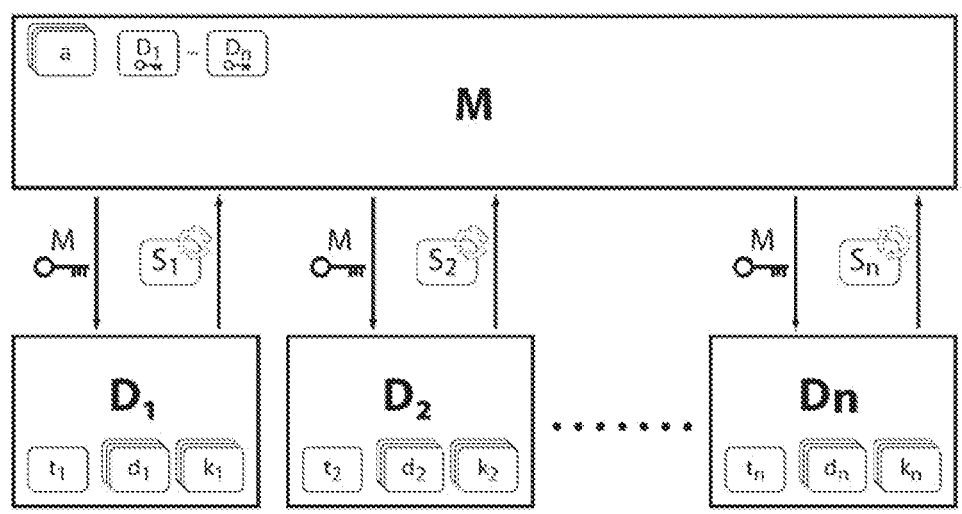

FIGS. 5A and 5B are block diagrams which illustrate the interaction between a model object and the data objects assigned thereto when calculating the target function for the numerical optimization. This calculation is undertaken by the optimization module 150 of the arrangement according to the invention.

What is intended to be optimized are the variable parameters of the model object M in a manner dependent on the data objects $D_i$, which are assigned to the model object M. The following steps illustrated in FIG. 5A are, to this end, carried out for all assigned data objects $D_i$. Initially, a reference to the model object M is transferred to the data object $D_i$. The data object $D_i$ then supplies the measurement time t back to the model object M. Then, the position function, which is determined by the parameters a, is evaluated in the model object at the time t. The resulting location x is returned to the data object $D_i$. The data object $D_i$ now applies the parameter adaptation function $P_i(x,t)$ thereof to the location and the time. In addition to the sensor data d, the parameter adaptation function usually also includes further sensor parameters k, which e.g. specify the location of the sensor and optionally also the speed thereof at the measurement time. An adaptation term $S_i$ is then calculated from the obtained value of the parameter adaptation function and it is returned to the model object M. It corresponds to a statement relating to how precisely the measured value, which is represented by the data object $D_i$, is reproduced by the parameterization of the model object M. In principle, the value of the validation function $V_i$ can be returned as adaptation term $S_i$. However, as described in more detail below, use can be made of a specific parameter adaptation function for the purposes of improving the numerical optimization; said specific parameter adaptation function can moreover still be conditioned such that it is not the value of the validation function, but the value of the (optionally conditioned) parameter adaptation function that is returned.

FIG. 5B illustrates the above-described steps for the data objects $D_1, D_2, \ldots, D_n$ in a simplified form. The processing for the individual data objects can be carried out in succession or simultaneously. The model object M transmits the reference thereof to all of the data objects $D_1, D_2, \ldots, D_n$ assigned thereto and receives back correspondingly many adaptation terms $S_1, S_2, \ldots, S_n$. The target function is then generated from these adaptation terms $S_1, S_2, \ldots, S_n$, for example by virtue of all adaptation terms $S_1, S_2, \ldots, S_n$ being added.

Figure 6:
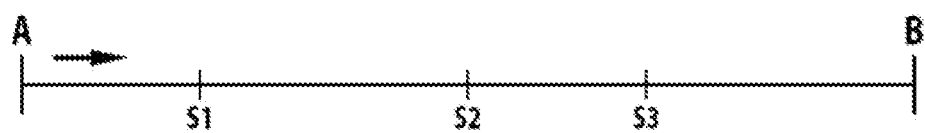
FIG. 6 shows the illustration of a simplified example for illustrating the progress of the method according to the invention.

The progress of the method according to the invention is depicted on the basis of a simplified example in conjunction with FIG. 6.

On a train track from A to B, the length of which is 10 km overall, sensors (S1, S2, S3) which measure the speed of passing trains are installed at 2 km, 5 km and 7 km. The measured values are provided with a timestamp by the sensors and transmitted to a central evaluation station for evaluation purposes.

Proceeding from a measurement inaccuracy of the speed values $v_0$ of $\sigma_v=5$ m/s and a range of the sensors, which leads to an uncertainty in the position of the train in relation to the sensor location $\mu_x$, of $\sigma_x=100$ m, the probability density function of the sensors is modeled as follows:

$$PDF(x,v) = \exp\left(-\frac{(x-\mu_x)^2}{2\sigma_x^2} - \frac{(v-\mu_v)^2}{2\sigma_v^2}\right) \quad (1.1)$$

where x and v are the suspected position and speed of the train at the measurement. In the present example, $\mu_v=0$, because the sensors are stationary in relation to the considered stationary reference system. Two auxiliary functions are defined for the following discussion:

$$L(x,v) = \frac{(x-\mu_x)^2}{\sigma_x^2} + \frac{(v-\mu_v)^2}{\sigma_v^2} \quad \text{and} \quad (1.2)$$

$$R(x,v) = \begin{cases} L(x,t) & \text{if } L(x,t) < S^2 \\ S^2 & \text{otherwise} \end{cases} \quad (1.3)$$

Thus, the following applies:

$$PDF'(x,v) = \exp(-\tfrac{1}{2}L(x,v)) \quad (1.4)$$

$$PDF'(x,v) = \exp\sqrt{L(x,v)} \quad (1.5)$$

is used as validation function, while the following is used as a parameter adaptation function:

$$P(x,v) = R(x,v) + \frac{\sqrt{L(x,v)}}{W}. \quad (1.6)$$

The values W and S, which parameterize the conditioning, are selected as W=3 and S=4 in the described example.

The trains are modeled as follows by model objects $M_i$:

$$\vec{X}(t,\vec{a}) = \begin{pmatrix} x \\ v \end{pmatrix} = \begin{pmatrix} a_0 + a_1 t \\ a_1 \end{pmatrix} \quad (1.7)$$

Here, $\vec{a}$ combines the changeable parameters $a_0$ (position of the train at the time t=0) and $a_1$ (speed of the train) and $\vec{X}$ combines the coordinates (x,v) of the reference coordinate system.

A model object-specific target function $Q_0$ is defined by the sum of the sensor-specific parameter adaptation functions:

$$Q_0(\vec{a}) = \sum_i P_i(\vec{X}). \quad (1.8)$$

Here, for the conversion from $\vec{a}$ to $\vec{X}$, the function (1.7) is evaluated at the point $t=t_i$, i.e. the validity time of the data object, for each assigned data object.

The method is now played out with concrete numbers. In this example, the sensors supply the following values:

| Index | Sensor | Sensor position $x_0$ [m] | $t_i$ [s] | $v_{0,i}$ [m/s] |
|---|---|---|---|---|
| 1 | S1 | 2000 | −92.2 | 51.20 |
| 2 | S2 | 5000 | −30.9 | 45.55 |
| 3 | S1 | 2000 | −4.7 | 48.80 |
| 4 | S3 | 7000 | 9.4 | 53.30 |
| 5 | S2 | 5000 | 77.0 | 33.55 |
| 6 | S3 | 7000 | 128.9 | 31.15 |

The following sequence emerges:
1. Sensor S1 supplies the value (−92.2, 51.20). Since no model object instance is present, a new instance $M_1$ is generated and initialized with ($a_{0,1}=0$; $a_{1,1}=0$).
2. The data object D1 with the first sensor data is assigned to M1.
3. The minimization of the target function $Q_1(\vec{a}_1)$ corresponding to M1 results in $a_{0,1}=6721$; $a_{1,1}=51.2$.
4. Sensor S2 supplies the value (−30.9, 45.55). The data object-specific validation function $V_2(x,v)$ supplies the correspondence value $V_{21}=1.788$ in relation to M1, i.e. $V_2(\vec{X}_1(\vec{a}_1,t=t_2))$, which is sufficiently small to justify an assignment of the data object D2 to M1.
5. The data object D2 with the second sensor data record is therefore assigned to M1.
6. The minimization of the target function $Q_1(\vec{a})$ corresponding to M1 results in $a_{0,1}=6504$; $a_{1,1}=48.8$, i.e. an adaptation of the model parameters.
7. Sensor S1 supplies the value (−4.7, 48.80). Since $V_3(\vec{X}_1(\vec{a}_1, t=t_3))=42.742$, which is significantly too high for a justified assignment to M1, a new object model instance M2 is generated and initialized to (0, 0).
8. The data object D3 with the third sensor data record is assigned to M2.
9. The minimization of the target function $Q_2(\vec{a}_2)$ corresponding to M2 results in $a_{0,2}=2229$; $a_{1,2}=48.8$.
10. Sensor S3 supplies the value (9.4, 53.30). Due to the comparison of $V_4(\vec{X}_{21}(\vec{a}_1,t=t_4))=0.976$ and $V_4(\vec{X}_2(\vec{a}_2,t=t_4))=43.130$, it is clear that M1 fits better to the sensor data and that it is also compatible with the sensor data.
11. The data object D4 with the fourth sensor data record is assigned to M1.
12. The minimization of the target function $Q_1(\vec{a}_1)$ corresponding to M1 results in $a_{0,1}=6538$; $a_{1,2}=49.35$.
13. Sensor S2 supplies the value (77.0, 33.55). Calculating the validation functions results in $V_5(\vec{X}_1(\vec{a}_1, t=t_5))=53.468$ and $V_5(\vec{X}_2(\vec{a}_2, t=t_5))=10.350$. Both values are relatively high. Accordingly, by way of a test, there is an assignment of the data object D5 to both models M1 and M2 and there subsequently is a minimization of the corresponding target function Q. In order to ensure that all minima are detected, it is possible to carry out a plurality of minimizations with different start points and/or initial increments, as described below. What emerges from this is that the validation function $V_5(\vec{X}_2(\vec{a}_2, t=t_5))$ is only 0.85 after minimization. Therefore, the assignment of the data object D5 to M2 appears indicated.
14. Therefore, the data object D5 with the fifth sensor data record is assigned to M2.
15. The minimization of the target function $Q_2(\vec{a}_2)$ corresponding to M2 results in $a_{0,2}=2143$; $a_{1,2}=37.5$.
16. Sensor S3 supplies the value (128.9, 31.15). What becomes clear from the comparison of $V_6(\vec{X}_1(\vec{a}_1,t=t_6))=59.049$ and $V_6(\vec{X}_2(\vec{a}_2,t=t_6))=1.300$ is that M2 fits better to the sensor data and that it is also compatible with the sensor data.

17. The data object D6 with the sixth sensor data record is assigned to M2.
18. The minimization of the target function $Q_2(\vec{a}_2)$ corresponding to M2 results in $a_{0,2}=2158$; $a_{1,2}=37.41$.

The following values emerge for the model parameters as a result of the six considered sensor data records:
$a_{0,1}=6538$; $a_{1,1}=49.35$
$a_{0,2}=2158$; $a_{1,2}=37.41$.

Thus, a total of two trains were determined. The model parameters $\vec{a}_i$ were adapted continuously.

This simplified example illustrates the general progress of the method according to the invention. However, the following should be noted in relation to applications that are more complex:

The components of $\vec{X}$ will generally be the space and velocity coordinates of the modeled object. However, the model object can comprise further parameters which additionally characterize the object, e.g. the type of object, the visibility thereof or the acceleration thereof. In principle, any information that can be derived from the model and is of importance for estimating the plausibility is useful. That is why, in the implementation of the method in the form of software, it is advantageously not parameter values from the model object that are transmitted but rather a reference to the model object such that the corresponding routines, e.g. for calculating the correspondence value, can access the model parameters, or variables derived therefrom, respectively required thereby.

The mathematical description deviates from the example above if a time interval or even an unspecific time specification is available instead of a fixed (validity) time. The situation where no fixed validity time is present emerges, for example, when a "terrain model" or a "flight maneuver evaluation model" are added as additional data objects. By way of example, these will query the trajectory or the maximum or minimum values of the velocity and/or acceleration and respectively test these in relation to a specific hypothesis.

The sensor data represented by a data object can be very comprehensive (e.g. a whole video image) or virtually "empty" except for a priori data, i.e. contain no further specifications except for the validity time. The sequence in accordance with the example above would readily also work if the velocity specifications from one or more of the sensors were missing. The method does not distinguish between various classes of data included in the evaluation. What is required are data objects respectively containing a validation function, by means of which it is possible to establish, by way of a model object, a measure for the probability (correspondence value) that the model object corresponds to a real physical object in the observed space, which real physical object is characterized by the record, assigned to the data object, of a priori information and a posteriori information of an individual measurement of the sensor assigned to the data object.

Figure 7A:
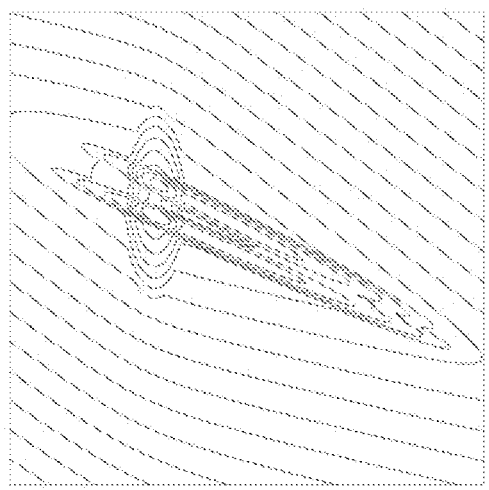
FIGS. 7A, B show an illustration of the target function with and without conditioning of the parameter adaptation functions.
Figure 7B:
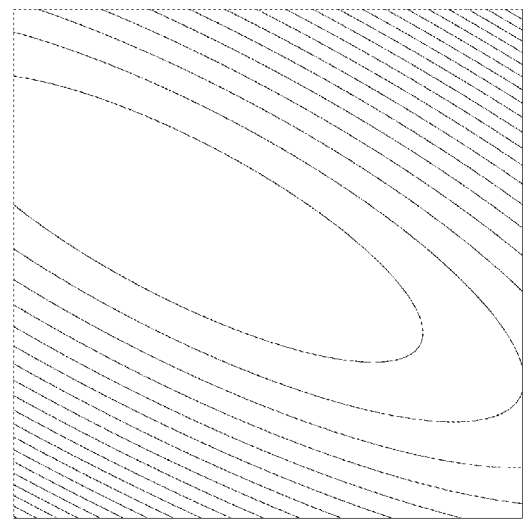

FIGS. 7A and B show contour plots which depict the target function with and without conditioning of the parameter adaptation functions, to be precise in the region of the minimum of the target function. In the depicted case, the target function represents an incorrect assignment of the data objects to the model objects. It is easily visible that a single minimum emerges in the unconditioned case (FIG. 7B). Due to the incorrect assignment, the function is slightly deformed in the region of the minimum and the minimum itself is displaced in relation to the minimum of a target function which only comprises the correct assignments.

The target function in FIG. 7A emerges if conditioning as described above is undertaken. It is easy to see that there are only three minima and it is readily clear that information in respect of the quality of the optimization can be obtained more easily, or even at all, from the conditioned target function. By way of example, it is easy to determine on the basis of the plot that the assignments should be verified because no unique situation is present.

In general, the parameter space is not two dimensional but higher dimensional, and so such a simple illustration as in FIG. 7 is not possible. In general, the optimization will supply one of the (local) minima. However, what can be obtained by adapting the minimization step or the initial point is that the other minima of the conditioned target function also emerge as results of further optimization processes. Accordingly, a number of minimizations with different method parameters are carried out. This can also be carried out in an automated fashion by virtue of the method parameters being varied systematically. The existence of a plurality of minima, the corresponding values of the optimized target function and the positions and distances thereof in the parameter space supply valuable indications about the correctness of the undertaken assignments.

Considered in the abstract, conditional probabilities are considered within the scope of the optimization; the condition corresponds to the given assignment between data and models. The conditioning now enables the retrieval of indications that the assignment may be incorrect. Stated more simply, each minimum of the conditioned target function corresponds to the position of a specific object under the assumption of a specific assignment.

Figure 8A:
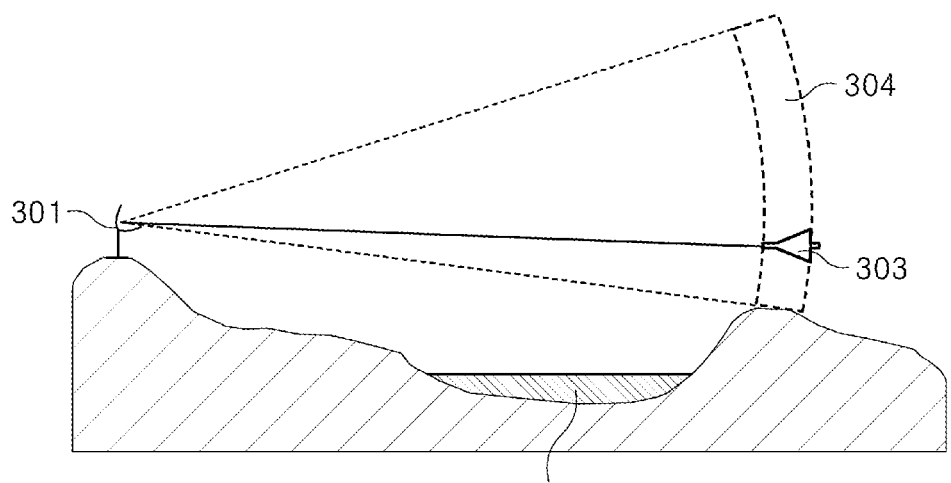
FIGS. 8A-C show a schematic illustration of taking reflections into consideration.
Figure 8B:
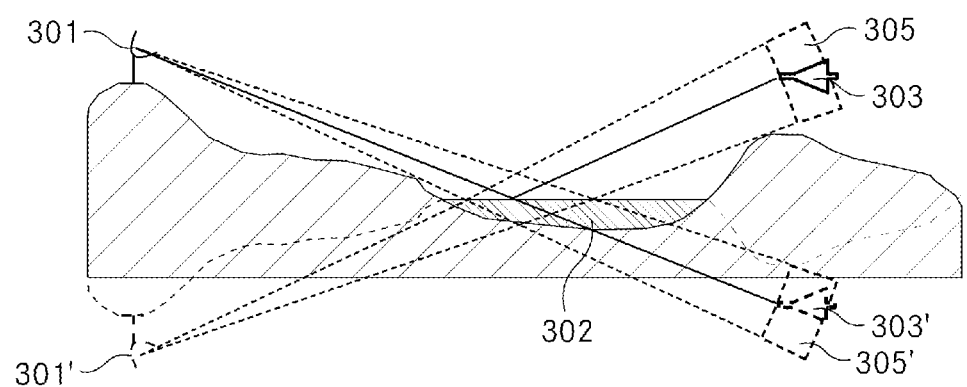
Figure 8C:
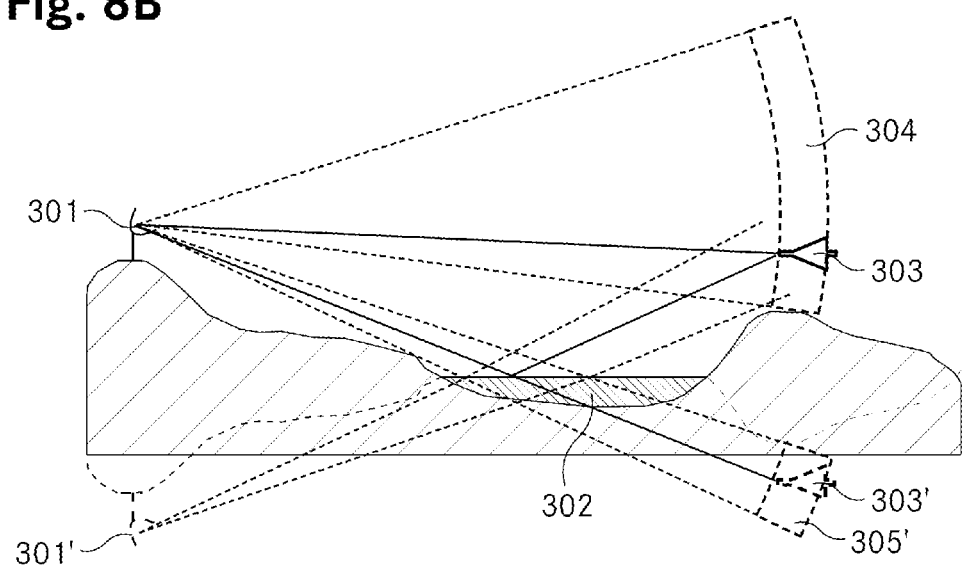

The consideration of reflections within the scope of a method according to the invention is illustrated in conjunction with FIGS. 8A-C.

In the illustrated example, a sensor 301 is placed in the terrain in such a way that there may be reflections at the surface of a lake 302 that is situated close by (see FIG. 8A). Here, this is a search radar, which only supplies an azimuth value and distance to the tracked object 303. The elevation is restricted to a certain range 304 by the system itself and by the terrain. This restriction by the terrain is calculated in advance and buffer stored in a suitable manner in a table.

Knowing the topography, a decision can be made here about the azimuth of the reference datum as to whether a reflection is possible and if an additional mapping mechanism is intended to be taken into account for considering the reflected signal when calculating the correspondence value and when calculating the target function for the numerical optimization.

The following now takes place during an iteration step of the parameter adaptation:
1. The corresponding term of the target function is calculated for the mapping without mirroring.
   a. The target position at the validity time of the reference datum is queried.
   b. The distance and elevation between target 303 and radar 301 are calculated.
   c. The lower boundary of the elevation range 304, which emerges from the terrain, is adapted on the basis of the distance.
   d. The probability density in respect of the elevation is modified, i.e. it is cut off (set to zero) in the forbidden region.

e. The term of the target function formed from the density function is formed from the elevation range 304, the distance, the azimuth, the respective error statistics and the aforementioned funnel term.
2. The corresponding term of the target function is calculated for the mapping with mirroring; the corresponding situation is depicted in FIG. 8B:
   a. The position of the sensor 301 and/or of the target 303 is mirrored at the surface of the lake 302. The mirrored positions of the sensor 301' and the target 303' emerge (cf. FIG. 8B).
   b. The distance and elevation between the mirrored target 303' and the radar 301 (and/or between the target 303 and the mirrored radar 301') are calculated.
   c. The lower boundary of the elevation range 305', which emerges from the terrain and corresponds to the upper boundary of the elevation range 305, is adapted on the basis of the distance (on the path prior to mirroring).
   d. The lower boundary of the elevation range 305, which emerges from the terrain, is (likewise) adapted on the basis of the distance (on the path after mirroring).
   e. The upper and lower boundary of the elevation range 305 of the mirrored signal are adapted (the mirroring surface must cover the whole elevation range).
   f. After mirroring, the upper boundary of the elevation range 305 becomes the lower boundary; therefore, the adaptation of the lower elevation boundary emerges from the path after the mirroring.
   g. The probability density in respect of the elevation is modified, i.e. it is cut off (set to zero) in the forbidden region.
   h. The term of the target function formed from the density function is formed from the elevation range, the distance, the azimuth, the respective error statistics and the aforementioned funnel term.
3. The combined portion of the target function, formed from the sum of the two terms from steps 1 and 2, is returned. The overall situation is shown in FIG. 8C.

As a result of this handling, radar data caused by mirroring are not simply discarded but are readily included in the parameter adaptation.

The invention is not restricted to the exemplary embodiments depicted above. In particular, the specific form of the employed calculation prescriptions may be different. Moreover, the conditioning of the target function is not restricted to the use in methods for determining trajectories of movable physical objects but can instead be used advantageously in a number of methods which comprise the numerical optimization of a target function.

In conclusion, it should be noted that the invention develops a method for determining trajectories of movable physical objects and an appropriate arrangement, which have high flexibility and supply highly precise results.

The invention claimed is:

1. A method for determining trajectories of movable physical objects in an observed space on the basis of sensor data from a plurality of sensors using data objects and model objects which are instances of a data object class or a model object class, comprising the following steps:
   generating first data objects based on the sensor data, wherein each first data object comprises at least one timestamp and one location specification of a physical object detected by at least one of the plurality of sensors, and a validation function;
   providing, based on the generated first data objects, at least one model object, which defines a parameterization function which describes a trajectory of a movable physical object with at least one variable parameter by initializing a new model object and assigning one of the generated first data objects to the new model object if no model objects are already initialized;
   if model objects are already initialized, calculating, for each of the generated first data objects, correspondence values by way of evaluating the validation function of the respective generated first data object for the model objects, the correspondence values being a measure for how likely it is that a respective one of the model objects corresponds to a real physical object in the observed space characterized by information comprised by the respective generated first data object;
   for each of the generated first data objects determining if at least one of the correspondence values related to this data object lies in a predetermined range, and
   if this is the case, assigning this data object to the one existing model object that is selected from among the existing model objects such that the correspondence value related to the respective data object and the selected existing model object corresponds to the highest likelihood among the existing model objects that the selected model object corresponds to the object represented by the respective data object;
   if none of the correspondence values related to this data object lie in the predetermined range, initializing a new model object and assigning this data object to the new model object; and
   performing, for each existing model object to which a generated first data object has been assigned, a numerical optimization of a target function for the existing model object by varying the at least one variable parameter of the parameterization function, wherein the target function is a function of parameter adaptation functions of at least some of the data objects assigned to the model object, and updating the at least one variable parameter of this model object based on the numerical optimization.

2. The method of claim 1, wherein the validation function of the first data objects supplies a value which is a measure for a probability that a considered one of the model objects corresponds to a physical object in the observed space, which physical object is represented by the data of the data object.

3. The method of claim 1, wherein the sensor data are radar data, in particular distance and angle information from a plurality of search radars that are spaced apart in space.

4. The method of claim 1, wherein second data objects are provided and assigned to one or more model objects, wherein these second data objects represent previously known information.

5. The method of claim 4, wherein the validation function of at least one of the second data objects supplies a value which is a measure for a probability that a considered one of the model objects corresponds to a physical object in the observed space.

6. The method of claim 1, wherein model-assisted mapping to temporal and/or spatial specifications is applied for evaluating the validation function of the data object for the model objects and for calculating at least one of the parameter adaptation functions, wherein the employed model models interference effects which influence the sensor data detected by the corresponding sensor.

7. The method of claim 6, wherein the model-assisted mapping generates two or more images in order to detect interference effects which lead to a multiplication of signals of a physical object to be detected.

8. The method according to claim 1, wherein the target function comprises a function for the numerical optimization which links sensor data representing different times from the same sensor, wherein the function is defined in such a way that in the numerical optimization parameters are preferred that correspond to unchanging influences of systematic errors on the sensor data of the various times.

9. The method of claim 1, wherein a reference is transferred to the respective model object for calculating the correspondence values of the relevant data objects such that the data of the model object are accessible to the validation function of the data object.

10. The method of claim 1, wherein the model objects comprise further parameters, which describe properties of the modeled object.

11. The method of claim 1, wherein conditioning of the target function of the optimization is carried out for the numerical optimization of the correspondence value by virtue of modifying at least one of the parameter adaptation functions of at least one of the first data objects, wherein the modification is effected independently of the at least one parameter adaptation function, in such a way that the at least one parameter adaptation function is preserved in a region of the parameter space of the at least one parameter adaption function corresponding to a spatial region which surrounds a location corresponding to the location specification of the data object, and that outside this spatial region a gradient of the at least one parameter adaptation function is set to a magnitude in a predetermined range.

12. The method of claim 11, wherein the conditioning comprises the following steps:
   a) cutting off an unmodified parameter adaptation function along a boundary which corresponds to a lower bound of a probability of presence to obtain a resulting function;
   b) complementing the resulting function by an auxiliary function such that the gradient of the modified parameter adaptation function has the magnitude in the predetermined range, except for in a region within the boundary.

13. The method of claim 11, wherein, except for a first constant term, the modified parameter adaptation function is proportional to the logarithm of a probability of presence at the corresponding location at locations in a region surrounding an expected location at the considered time on the basis of the data object and outside said region, except for a second constant term, the modified validation function is proportional to the distance between said location and said expected location.

14. The method of claim 11, wherein, in the region of the parameter space which corresponds to the spatial region that surrounds the expected location on the basis of the data object, the modified parameter adaptation function represents a quadratic form of the parameters, which are to be optimized numerically, of the parameter adaptation function and in that the magnitude of the gradient of the modified parameter adaptation function outside of this region is constant or monotonically decreasing with increasing distance from the region.

15. The method of claim 14, wherein the modified parameter adaptation function $P_{mod}(\vec{x})$ for conditioning the target function is constructed as follows:

$$P_{mod}(\vec{x}) = R(\vec{x}) + \frac{1}{W}\sqrt{-\log(PDF'(\vec{x}))},$$

where $\vec{x}$ is a parameter vector, $PDF(\vec{x})$ is a probability density function, and the following applies to $R(\vec{x})$:
a) $R(\vec{x})$ is proportional to $-\log(PDF'(\vec{x}))$ within the region of the parameter space which corresponds to the spatial region that surrounds the expected location on the basis of the data object;
b) $R(\vec{x})$ is constant outside of the region of the parameter space which corresponds to the spatial region that surrounds the expected location on the basis of the data object,
and where W is a predeterminable parameter.

16. The method of claim 15, wherein $R(\vec{x}) = -2\log(PDF'(\vec{x}))$ for $-2\log(PDF'(\vec{x})) < S^2$ and $R(\vec{x}) = S^2$ for $-2\log(PDF'(\vec{x})) \geq S^2$, where S is a predeterminable parameter.

17. The method of claim 1, wherein the numerical optimization is implemented using one of the following methods:
   i. a downhill simplex method;
   ii. a gradient-based method.

18. An arrangement for determining trajectories of movable physical objects in an observed space using data objects and model objects which are instances of a data object class or a model object class, comprising
   a plurality of sensors for detecting the physical objects in the observed space;
   a first processor configured to generate first data objects based on the sensor data, wherein each first data object comprises at least one timestamp and one location specification of a physical object detected by at least one of the plurality of sensors, and a validation function;
   a second processor configured to provide, based on the generated first data objects, at least one model object, which defines a parameterization function which describes a trajectory of a movable physical object with at least one variable parameter;
   a third processor configured to calculate, for each generated first data object, correspondence values by way of evaluating the validation function of the respective generated first data object for the model objects, the correspondence values being a measure for how likely it is that a respective one of the model objects corresponds to a real physical object in the observed space characterized by information comprised by the respective generated first data object;
   a fourth processor for initializing a new model object;
   a fifth processor configured to determine for each of the generated first data objects if at least one of the correspondence values related to this data object lies in a predetermined range and to assign one of the data objects to at least one of the model objects,
   the fourth processor and the fifth processor being controlled to determine for each of the generated first data objects if at least one of the correspondence values related to this data object lies in a predetermined range and to initialize a new model and to assign this data object to the initialized new model object if the generated first data object is an initial data object or none of the correspondence values lie in a predetermined range, or, if at least one of the correspondence values related to this data object lies in the predetermined range, to assign this data object to a selected existing model object such that the correspondence value related to the respective first data object and the selected existing model object corresponds to the highest likelihood among the existing model objects that the selected model object corresponds to the object represented by the respective data object; and a sixth processor configured to perform, for each existing model object to which a generated first data object has been assigned, a numerical optimization of a target function for the existing model object by varying the at least one variable parameter of the parameterization function, wherein the target function is a function of parameter adaptation functions of at least some of the data objects assigned to the model object, and for updating the at least one variable parameter of the model object based on the numerical optimization.

19. The arrangement of claim 18, comprising a sensor station, which comprises the following:
a) at least one of the sensors for detecting the objects in the space; and
b) the first processor for generating first data objects based on the sensor data, wherein each first data object comprises at least one timestamp and one location specification of the object detected by the at least one sensor, and a validation function.

20. The arrangement of claim 19, comprising a processing station, which comprises the following:
a) the second processor for providing the at least one model object;
b) the third processor for calculating the correspondence value;
c) the fourth processor for providing the additional model object;
d) the fifth processor for assigning one of the data objects to at least one of the model objects; and
e) the sixth processor for the numerical optimization of the target function,
wherein the arrangement furthermore comprises a network for connecting the sensor station with the processing station.

21. The method of claim 4, wherein the previously known information comprises information on suspected future events.

22. The method of claim 4, wherein the previously known information comprises information on boundary conditions in relation to possible trajectories.

23. The method of claim 22, wherein the boundary conditions comprise maximum speeds or accelerations.

24. The method of claim 10, wherein the further parameters represent an object type or specify physical properties of the object.

25. A method for determining trajectories of movable physical objects in a space on the basis of sensor data from a plurality of sensors, comprising the following steps:
generating first data objects based on the sensor data, wherein each first data object comprises at least one timestamp and one location specification of an object detected by at least one of the sensors, and a validation function;

providing at least one model object, which represents a parameterization of a trajectory of one of the movable objects with at least one variable parameter;

for each of the first data objects:
calculating correspondence values for an assignment of the data object to at least one of the model objects provided by way of evaluating the validation function of the data object for the model objects, the correspondence values being a measure for a probability that the at least one of the model objects corresponds to a real physical object in the observed space characterized by information comprised by the data object;

providing an additional model object and assigning the data object to the additional model object if none of the correspondence values lie in a predetermined range;

assigning the data object to a selected model object selected from among the existing model objects such that the correspondence value related to the data object and the selected model object corresponds to the highest likelihood among the existing model objects that the selected model object corresponds to the object represented by the respective data object, if at least one of the correspondence values lies in the predetermined range; and performing a numerical optimization of a target function for the model object to which the data object was assigned, by varying the at least one variable parameter of the model object, wherein the target function is a function of parameter adaptation functions of at least some of the data objects assigned to the model object, and updating the at least one variable parameter of this model object, wherein conditioning of the target function of the optimization is carried out for the numerical optimization of the correspondence value by virtue of modifying at least one of the parameter adaptation functions of at least one of the first data objects, wherein the modification is effected independently of the at least one parameter adaptation function, in such a way that a gradient of the at least one parameter adaptation function is set to a magnitude in the at least one parameter adaptation function is preserved in a region of the parameter space of the at least one parameter adaptation function corresponding to a spatial region which surrounds a location corresponding to the location specification of the data object, and that outside this spatial region a gradient of the at least one parameter adaptation function is set to a magnitude in a predetermined range.

* * * * *